US007894458B2

(12) United States Patent
Jiang et al.

(10) Patent No.: US 7,894,458 B2
(45) Date of Patent: Feb. 22, 2011

(54) SYSTEM AND COMMUNICATION METHOD OF IP TELECOMMUNICATION NETWORK AND ITS APPLICATION

(75) Inventors: Lin Tao Jiang, Beijing (CN); Wen Hong Liu, Beijing (CN); Zhuhua Hu, Beijing (CN); Yu Fa Ma, Beijing (CN); Lin Wei Jiang, Shanghai (CN)

(73) Assignee: Beijing Jiaxun Feihong Electrical Co., Ltd., Haidian District, Beijing (CN)

( * ) Notice: Subject to any disclaimer, the term of this patent is extended or adjusted under 35 U.S.C. 154(b) by 995 days.

(21) Appl. No.: 11/587,810

(22) PCT Filed: Apr. 28, 2005

(86) PCT No.: PCT/CN2005/000594

§ 371 (c)(1),
(2), (4) Date: Oct. 27, 2006

(87) PCT Pub. No.: WO2005/107161

PCT Pub. Date: Nov. 10, 2005

(65) Prior Publication Data

US 2008/0130661 A1 Jun. 5, 2008

(30) Foreign Application Priority Data

| Apr. 28, 2004 | (CN) | ......................... | 2004 1 0037641 |
| Jun. 21, 2004 | (CN) | ......................... | 2004 1 0049945 |
| Jun. 24, 2004 | (CN) | ......................... | 2004 1 0049707 |
| Jun. 24, 2004 | (CN) | ......................... | 2004 1 0049708 |
| Jul. 8, 2004 | (CN) | ......................... | 2004 1 0062652 |
| Aug. 5, 2004 | (CN) | ......................... | 2004 1 0070502 |
| Nov. 26, 2004 | (CN) | ......................... | 2004 1 0091776 |
| Mar. 1, 2005 | (CN) | ......................... | 2005 1 0008787 |
| Mar. 1, 2005 | (CN) | ......................... | 2005 1 0008788 |

(51) Int. Cl.
*H04L 12/28* (2006.01)
(52) U.S. Cl. .................................................... 370/401
(58) Field of Classification Search .................. 370/351, 370/395.1, 395.5, 395.54, 389, 401, 432, 370/395.43, 392
See application file for complete search history.

(56) References Cited

U.S. PATENT DOCUMENTS 5,159,695 A 10/1992 Comroe et al.
(Continued)

FOREIGN PATENT DOCUMENTS

CN 1398090 2/2003
(Continued)

OTHER PUBLICATIONS

PCT/ISA/237, Aug. 31, 2005, Chinese Patent Office.
(Continued)

*Primary Examiner*—Dang T Ton
*Assistant Examiner*—Kevin Lee
(74) *Attorney, Agent, or Firm*—Lau & Associates, LLC

(57) ABSTRACT

The present invention provides one kind of IP telecom network system and its realizing method, and a method of building virtual private network and carrying out multicast based on this IP telecom network, and a method of managing resource in this IP telecom network etc. The IP telecom network system includes at least one complex address no-connection data network including at least one address mapping device, several IP networks and several edge pass devices for connection between the IP network and data network address. Each of the devices and the edge pass devices in the data network has one distributed data network address, each of the devices and the edge pass devices in the IP network has one distributed IP address, and the mapping relation between the IP address and the data network address is maintained in the address mapping table in the address mapping device. The IP network provided by this invention can be work as the next generation IP telecom network The IP telecom network system can realize the integration of telecom business in one IP network.

12 Claims, 21 Drawing Sheets

U.S. PATENT DOCUMENTS

| | | | |
|---|---|---|---|
| 7,411,955 B2 * | 8/2008 | Li et al. | 370/392 |
| 2003/0134651 A1 | 7/2003 | Hsu | |
| 2004/0202171 A1 * | 10/2004 | Hama | 370/395.1 |

FOREIGN PATENT DOCUMENTS

| | | |
|---|---|---|
| WO | WO03001717 | 1/2003 |
| WO | WO03051002 | 6/2003 |

OTHER PUBLICATIONS

PCT/ISA/210, Sep. 15, 2005, Chinese Patent Office.

* cited by examiner

EHI: Extended header Identifier
ID: identifier
Multi: multicast
Com: compression

SYSTEM AND COMMUNICATION METHOD OF IP TELECOMMUNICATION NETWORK AND ITS APPLICATION

FIELD OF THE INVENTION

This invention relates to an IP Telecom Network system, it also relates to the communication methods used in this IP Telecom Network system, the methods to realize a virtual private network (hereinafter referred to as "VPN") and the multicast functions based on IP Telecom Network system, and the methods providing resource management within an IP Telecom Network system, etc. It belongs to the telecommunications technical field.

BACKGROUND OF THE INVENTION

Now days, the development of the telecomm networks has entered a cross road. Traditional telecom networks are heavily impacted by new IP networks designed based on the Internet idea increasingly, they are in a process of the essential transformation. During this process, it is gradually realized that the next generational telecom network should take advantage of the IP network using packet-based switch technology and a connectionless operation mode, and take advantage of the technical idea that complex flow control technology should not be used between network devices. And this idea is begun to be practiced.

IP networks are tries to be used to carry telecommunication services in some areas of current telecom networks. Some of them are partly successful. IP telephone services used currently is one typical example. But, telecommunication services have very high requirements for the security and the Quality of Service (hereinafter referred to as "QoS") themselves. Because Internet, as a representative of existing IP networks, is a kind of network with free, open mechanisms, but without uniform management mechanism. Its design idea is to provide users a free, convenient platform. And the users' work had better not to be disturbed by the networks except that some network access fee needs to be charged to remain networks existence, in that case, network operators take charge of nothing but some management mechanism of users authentication. Therefore, users do not believe that the telecommunications services with high security requirements can be carried over existing Internet without security and trust guarantee. Now, important commercial services networks, even services data of large enterprise networks have not been carried over the public IP networks of the enterprises. On the other hand, there are not heavy problems to provide voice communications services with less quality of service requirements currently over Internet because Internet does not have any management and quality of services guarantee. But once data services and real time video services with high QoS requirements need to be provided, existing Internet can not meet the requirements. This is why some important cases transmitted over networks often need the separate telecom security arrangement provided by the telecom operators.

Because of the questions above, it is noticed that next generation telecom networks can not be realized by migrating telecommunications services to the existing Internet simply. Next generation telecom network will be IP network, but it is an IP Telecom Network which design idea is very different from that of existing IP network based on Internet design idea. (see Jiang Lintao: The research on IP telecommunications technology, <<ZTC Telecom technology>> 2003.1 and The research on next generation telecom network, <<Telecommunications science>>, 2004.1). On the one hand, IP Telecom Network should fully absorb the technical advantages brought by IP network's connectionless character; on the other hand, there is a need to meet the telecommunications services' high requirements to security and quality of service. Though this idea has been brought out for a period of time, there has still not been a technical solution for it until now.

SUMMARY OF THE INVENTION

Thus, the object underlying the invention is to provide an integral technical solution to realize IP Telecom Network. This technical solution includes the basic architecture of IP telecommunications network system and the methods to realize communications, the methods to realize VPNs and multicast functions, the methods to manage the resources within an IP Telecom Network system, the methods to compress the headers of packets transmitted within it, and the special packet formats transmitted and their implementation mechanism, etc.

To realize the object above, this invention uses the following technical solutions:

An IP Telecom Network system comprises at least one dual-address connectionless data network (hereinafter referred to as "NCT data network" or "NCT"), a plurality of IP networks and a plurality of edge gateway devices, wherein, the IP network connects with the dual-address connectionless data networks through the edge gateway devices, each dual-address connectionless data network includes at least one address mapping device (hereinafter referred to as "ADT"), each device within the dual-address connectionless data network and each edge gateway device (hereinafter referred to as "ED") are individually assigned an address of the dual-address connectionless data network, and each device within the IP network and each edge gateway device are individually assigned an IP address, a mapping relationship between the IP address and the dual-address data networks address is stored in the address mapping table of the address mapping device.

The ED described sets up a connection with the ADT described after it passes the authentication.

Among them, the dual-address connectionless data network described has the layered architecture; it is composed of different layers based on different network scale.

The dual-address connectionless data network described is generally composed of three layers: a core layer, a converge layer and an access layer, the core layer, the converge layer and the access layer is composed of many core layer devices, many converge layer devices and many access layer devices separately, each access layer device connects with at least one ED described and connects with a converge layer device upward; the converge layer device described connects with the core layer devices, the core layer devices described connect with each other; the dual-address connectionless data network described includes the network management devices and the ADTs, the network management devices manage the access layer devices, the converge layer devices and the core layer devices at the same time.

There are several dual-address connectionless data networks described, and there is a trust relationship between them.

The dual-address connectionless data network described sets up connections with IP networks described through the EDs described, and there is a trustful relationship among the devices.

The dual-address connectionless data network addresses are used to address within a dual-address connectionless data network described, the address assignment of a dual-address connectionless data network described follows a location related hierarchical address assignment rule.

The EDs described converge the service streams coming from IP networks described and forward them to the destination EDs at the other sides of a data network described, and the service streams converged are sent to the devices of IP networks at the destinations.

From the topology architecture point of view, IP networks are separated from dual-address data networks, they connect with each other through the EDs.

The dual-address data networks can work in both connection-oriented operation (tunnel mode) and connectionless operation modes, they use determined routing in both operation modes.

A kind of communication method in IP Telecom Network system, comprising the Further step of:
(1) All the devices are assigned the dual-address connectionless data network addresses within a dual-address connectionless data network;
(2) The EDs described register to the ADTs and send address mapping relationship tables to the ADTs after they pass the authentications;
(3) The source EDs receive IP packets from IP networks and send the IP destination addresses within the IP packets to the ADTs;
(4) The ADTs make the address resolution and address mapping between IP destination addresses of IP networks and connectionless data network addresses, and send the data network addresses of the destination EDs got back to the source EDs;
(5) The source EDs send messages to the destination EDs based on the dual-address connectionless data network addresses;
(6) The destination EDs receive the messages and forward the messages received based on the destination IP addresses.

While working in connectionless operation mode, all the devices within a dual-address connectionless data network address using dual-address connectionless data network addresses, and there are entire dual-address connectionless data network addresses in the messages transmitted within a dual-address connectionless data network. The address mapping relationship in the step (2) refers to the mapping relationship between the data network addresses of the EDs described and the addresses of all the devices in the IP networks connecting with the IP networks.

In the step (5), when a message is transmitted only within a dual-address data network, the message is sent to an access layer device by the source ED described and it is forwarded to a convergence layer device, if the convergence layer device decides that the message should be forwarded to an access layer device belonging to the convergence device based on the dual-address connectionless data network address, then the message is sent to the access layer device based on the dual-address connectionless data network address directly, then the access layer device sends the message to the destination ED based on a dual-address connectionless data network address.

Or, when a message is transmitted within a dual-address data network, the message is sent to an access layer device by a source ED described, and it is forwarded to a converged layer device, then it is forwarded to a core layer device, if the core layer device described decides that the message should be sent to an access layer device based on dual-address connectionless data network address, the message is sent to the access device through a converged layer device, then the access layer device sends the message to the destination ED based on the dual-address connectionless data network address.

Or, when a message need to be sent from one dual-address connectionless data network to other dual-address connectionless data network, the message coming from a source ED is converged layer by layer, in other words, it is converged at an access layer device, a converged layer device to a core layer device, then it is forwarded to the other dual-address connectionless data network through a core device, then it is sent from the core layer device to its destination ED layer by layer within that dual-address connectionless data network.

While working in connection-oriented tunnel mode, wherein:

The network management device in an IP Telecom Network described sets up tunnels within a dual-address connectionless data network, the tunnels described are virtual circuits established among the EDs at both sides;

IP packets bearing user communications services reach source EDs of the tunnels described through IP networks, they are transferred into data frames in a dual-address connectionless data network, after the addresses resolution and address mapping is finished, they are transmitted along the tunnels described, and they are resumed to the IP packets and are sent after they reach the destination EDs of the tunnels described. Where, when the data frames described are transmitted between two adjacent network nodes within a tunnel described, connection labels are used to address.

The dual-address connectionless data network addresses in the packets of a dual-address connectionless data network described are replaced with the connection labels between this ED and the next level network node by a source ED described to form the dual-address data network data frames and the data frames are sent to the next level; the connection labels within the data frames in a dual-address connectionless data network described are replaced with the connection labels between this node and its next level by its next level node to form new data frames of the dual-address connectionless data network, the new data frames are forwarded along the tunnels described:

The data frames of a dual-address data network reach the destination EDs described in this way, the connection labels are resumed back to the dual-address connectionless data network addresses at destination EDs described.

The tunnel establishment procedure described includes the following steps:
A user sends a tunnel setup request to a network management device described, the network management device described authenticates this request;
The network management device described sends a tunnel setup command to a tunnel source ED;
After the source ED receives this command, it sends a tunnel connection setup request to a destination ED;
This request is sent level by level, each dual-address connectionless data network node device along the path makes its own decision according to its resource situation after it receives this request.
(5) If a node device describe red meets the resource request needs, it configures the link resources, assigns the connection labels, fills in a link forward table and forwards this request to the next node until the destination ED;
(6) If the resource situation at the destination ED can afford this tunnel connection establishment, then the destination ED sends an accept response to the source ED;
(7) The source ED sends a tunnel setup acknowledgement response to a network management device described, after it receives the accept response from the destination ED;

(8) The tunnel is established successfully while the network management device receives the tunnel setup acknowledge response.

A kind of method to realize VPNs within an IP Telecom Network, its features include the following steps:

A user sends a VPN setup request and hands in the flux, flow direction table needed to set up this VPN to a network management device.

The network management device assigns a VPN number to the request accepted;

The ADT described produces the node address mapping table including this VPN number;

(4) The network management device sends the configuration command to a dual-address connectionless data network node device or an ED connecting with it according to the flux and the flow direction table described, the node device and the ED accept this configuration command and set up a VPN, if their resources meet the requirements needed.

Where, during the procedure of a VPN establishment, a network management device calculates the requirement table of the link resources between the related nodes within a dual-address connectionless data network based on the flux, flow directions described, and it sends the link resource configuration command including a VPN number to a node device within the dual-address connectionless data network, then a VPN will be established based on this command.

Or, the network management device sends a VPN configuration table to a related ED based on the flux and flow direction table, the source ED sends the VPN configuration request to a destination ED based on the routing of a dual-address connectionless data network. A VPN is established based on this command.

During the procedure of requesting a VPN described, if the user is an IP network user, the flux and the flow direction table submitted are the flux and flow direction table at the IP network node, the network management device described gets the addresses of EDs connecting with each node in the IP network through an ADT and changes the flux and flow direction table into the flux and flow direction table among each ED. If a user is a dual-address connectionless data network user, then the flux and the flow direction table is the flux and the flow direction table among the EDs.

After a VPN is established, if the user is a dual-address connectionless data network user, then a communication procedure includes the following steps:

(1) The source ED sends the dual-address connectionless data network packets to a destination ED, when the packets reach a source ED, the source ED sends an address mapping request command including the parameters such as, the destination ED's address etc. to an ADT;

(2) The ADT receives the address mapping request command. If the source ED and the destination ED belong to the same VPN, then the source ED sends a response command including the parameters, such as a VPN number, a service class and a destination ED address etc.;

(3) The source ED receives this response command, it produces a dual-address connectionless data network packet including the parameters of a VPN number and, a service class number, and sends it to a destination ED;

(4) The node device within a dual-address connectionless data network sends this packet based on its VPN number, its service class and the address of the destination ED within the scope of resource assigned according to the VPN convention;

(5) The destination ED receives this dual-address connectionless data network packet and sends it to a destination.

After a VPN is established, if the user is an IP network user, a communication procedure includes the flowing steps:

(1) A source IP device sends IP packets to a destination IP device;

(2) When the IP packets reach a source EDs, the source ED sends an address mapping request command including a destination IP address to an ADT;

(3) The ADT receives this command, if the source IP address and the destination IP address belong to the same VPN, then it sends a response command including the parameters of a VPN number, a service class and a destination ED address;

(4) The source ED receives this response command, forms the dual-address connectionless data network packets with the VPN number, the service class, and it sends the packets to a destination ED;

(5) The node device within a dual-address connectionless data network sends the packets based on their VPN numbers, their service classes and the addresses of the destination EDs within the scope of resource assigned according to the VPN convention;

(6) The destination ED receives the dual-address connectionless data network packets, and it resumes the destination IP address, reconstructs the IP packets and sends them to the destination.

A kind of multicast establishment method within an IP Telecom Network system to realize multicast requested from a user to a network management device, this multicast realization method includes (1) multicast request; (2) multicast tree establishment; (3) multicast communications and (4) multicast termination four steps, comprising the further step of: within the procedure of multicast realization:

A user sends a network management device a request to set up a multicast, the network management device orders a dual-address connectionless data node device to configure resources, the network management device orders an ADT to set up a multicast related table to construct a multicast tree.

A kind of multicast realization method within an IP Telecom Network system to realize multicast initialized by a user, this multicast realization method includes (1) multicast announcement; (2) multicast tree establishment; (3) multicast communications; (4) multicast termination four steps, its feature exists in the procedure of multicast realization.

The exchange between the multicast packets using IP addresses and the multicast packets using dual-address connectionless data network addresses is realized by the EDs and the ADTs within a dual-address connectionless data network described.

A kind of resource management method based on link alarm mechanism within an IP Telecom Network system, comprising the further step of:

1) The services within an IP networks are classified, several resource independent virtual private networks are established for each class of service, and determined resources are configured for the links in VPNs;

2) Link alarm levels and the resource thresholds for related alarm levels are set during the procedure of establishing a virtual private network, node devices alarms to a network management device while the resource used by a user exceeds the link alarm threshold; the network management device notices the alarm information to an ADT.

3) For the new needs to the resources from a user described, the ED connecting with the user searches this user's resource situation, a connection can only be established when there is no alarm information within the ADTs described, and otherwise, the device refuses to establish a connection.

Where, the following steps are included within the step 2) described:

1) A resource alarm link is composed of the node devices, a network management device and the ADTs participating in a virtual private network;
2) While the resources used by some class of users have not exceeded the link alarm threshold for this class of service, the node devices do not send out alarm information; while the resources used by users of some class of service, have exceeded the link alarm threshold for this class of service, or the resources used by the users in a virtual private network for some class of service exceed the alarm threshold of this virtual private network, the node devices send out alarm information to the network management devices;
3) The network management devices notice the ADTs the alarm information containing the parameters of service classes, virtual private network number, and alarm levels.

There are the following steps within the step 3) described:

1) Once a user requests to set up a communication connection, an ED inquires an ADT about the user's or service network's resource situation, if the ADT indicates that there is not any link alarm for this user or service network link alarm link alarm, the communication connection is proceeded according to normal service flows;
2) If an ADT finds that there is some link alarm for this user or services network link alarm link alarm, the ADT sends a resource inquire request to a network management device to check if there is any alarm information along the links passed by this communication connection, while there is not any alarm information at the links passed by, the ADT indicates there is not any alarm along the links passed by, then the communication connection can be proceeded according to a normal services flow; while there is some alarm along the links passed by, the ADT indicates this user or service link alarm, this communication connection can not be established.

A kind of resource management method based on signaling mechanism within an IP Telecom Network system, comprising the further step of:

1) The services within the IP network are classified, several VPNs are established for each class of services separately, and the determined resources are configured for the links of a virtual private network;
2) An ED connecting with the user sends out a signaling including resources requirement parameters based on the user's resource request within a virtual private network, this signaling is sent to each related nodes within this special virtual private network, while the resources at all the nodes can meet the requirements, connection establishment is permitted to ensure users' resource needs.

Where, before the communication starts, connections need to be setup for the users who need resources within a virtual private network requested, and the resources used by these connections should be deleted from the resource table of the virtual private networks requested by users;

While the communications terminate, the connections disconnected and all the resources are added into the resources tables of the virtual private networks.

During connection establishment, if the resources belonging to this virtual private network within the nodes along can not meet the requirements of a connection, this connection can not be established.

During the communications, access control is done only at an ED; the node devices participating in this virtual private network do not make any resource control and management.

A kind of enveloping method for dual-address data network packets within an IP Telecom Network system, comprising the further step of:

A: An ED sets the value of a packet class field based on if it is a data packet or a control packet;
B: An ED decides the service type and sets the value of service class field based on the features of its carrier network;
C: An ED determines if the headers of data packets entering need to be compressed, if they need, go to the step D, otherwise, go to the step G;
D: To determine the value of the identifier field in the first packet;
E: To determine the value of message compressed field;
F: To set the value of flow sequence numbers;
G: To set the resource address and destination address.

Where, after the step B, the following steps are included:

C1) an ED determines if data packets belong to some VPN, if they do, go to step C2), otherwise, go to the step C;
C2) to set the value of the virtual private network identifier field;
C3) to set the value of the virtual private network number; go to the step F.

The step C3) includes: to set the virtual private network identifier field, to set the extended header identifier field of the packets which are the dual-address connectionless data network packets with the same source addresses, the same destination addresses, the same class of services, to assign different virtual private network numbers, and to put the virtual private network number fields in the extended headers.

After the step B, the following steps are included:

C11) an ED determines if the data packets entering belong to some multicast group, if they do, go to the step C12); if they do not, go to the step C;
C12) to set the value of multicast identifier field;
C13) to set the value of the multicast address field and put it into the destination field;
C14 To set the value of the first identifier field; if it is the first packet of the multicast service, go to the step C15), otherwise, go to the step F,
C15) to set the value of the extended header field, and go to the step F.

At the source ED, for the first packet with the same source address, the same service class, its identifier is set, its compressed identifier is not set and the determined flow sequence numbers are set.

For the following packets with the same sources, the same destination address and the same service class, their identifiers of the first packet are not set, their compressed packet identifiers are set and their stream sequence numbers are set.

At a source ED, for the first packet with the same source address, the same destination address, the same class of service, an IP packet is put in entirely as the payload of a dual-address connectionless data network packet; for the following packets with the same source address, the same destination address and the same service class, the payload of the IP packets are put into the payload of dual-address connectionless data network packets without the heads of the IP packets.

A kind of compression method to the headers of packets transmitted within the IP Telecom Network system, there is the first packet identifier domain, packet compression identifier domain, and stream identifier domain within the header of packets and comprising the further step of: to include the following steps:

IP network users send IP packets;

To determine if a packet is the first packet at the source ED passed by;

(3) If this packet is the first packet, then its first packet identifier is set, the packet compression identifier is not set, and a determined value is given to the stream identifier in the first dual-address connectionless data network packet, then all the IP packet including an IP header is put into the payload of the dual-address connectionless data network packet at the source ED; this dual-address connectionless data network packet is sent;

(4) If the IP packet is not the first packet, for the information packets in which headers there are the same source address, the same destination address and the same class of service with those in the first IP packet, the first packet identifiers of the header of dual-address connectionless data network packets corresponding to them are not set, their packet compression identifiers are set, and their stream identifiers are set to determined values, if they are determined to be the following IP packets. Then only the payloads of these packets are put into the payloads of the dual-address connectionless data network packets by the source EDs.

(5) The destination ED determines if the dual-address data network packet received is the first packet based on its first packet identifier and its message compression identifier within its header;

(6) If it is the first packet of a dual-address connectionless data network, then a mapping table between values of the stream identifiers and the IP headers derived from the payload of this dual-address connectionless data network packet is produced, based on the value of the stream identifier, and this mapping table is stored in a destination ED, then the IP packet is derived from the payload of the first dual-address connectionless data packet, and is put into a sending queue of the destination ED;

(7) If it is not the first packet of a dual-address connectionless data network, the destination ED determines which first packet's following packet it is based on the value of its stream identifier, for this following packet, related IP packet is derived from the mapping table based on the value of its stream identifier, it is put into an integrated IP packet together with the payload of the following packet, and the IP packet is put into a sending queue at the destination ED;

(8) The destination ED sends the IP packet to an IP network based on its IP address.

The IP Telecom Network, as a kind of next generation telecommunication network can be realized using the technical solutions described in this invention. The features of this IP Telecom Network are:

1 Its address resources are enough to support the continuous development of the telecommunication networks;

2 It is a kind of network which can be managed and maintained;

3 This network provides trust and security mechanism, and it is a trustworthy network;

4. This network has the flexibility of Internet, it can provide all the services provided by existing Internet, it also has the high stability, reliability and high manageability of a telecom network, its all the network resources can be allocated independently based on the requirements to services designs from operators, it also ensure the quality of services of existing telecommunications services and future new services.

BRIEF DESCRIPTION OF THE DRAWINGS

This invention is illustrated with figures and implementation methods as follows.

DETAILED DESCRIPTION OF PREFERRED EMBODIMENTS

Figure 1:
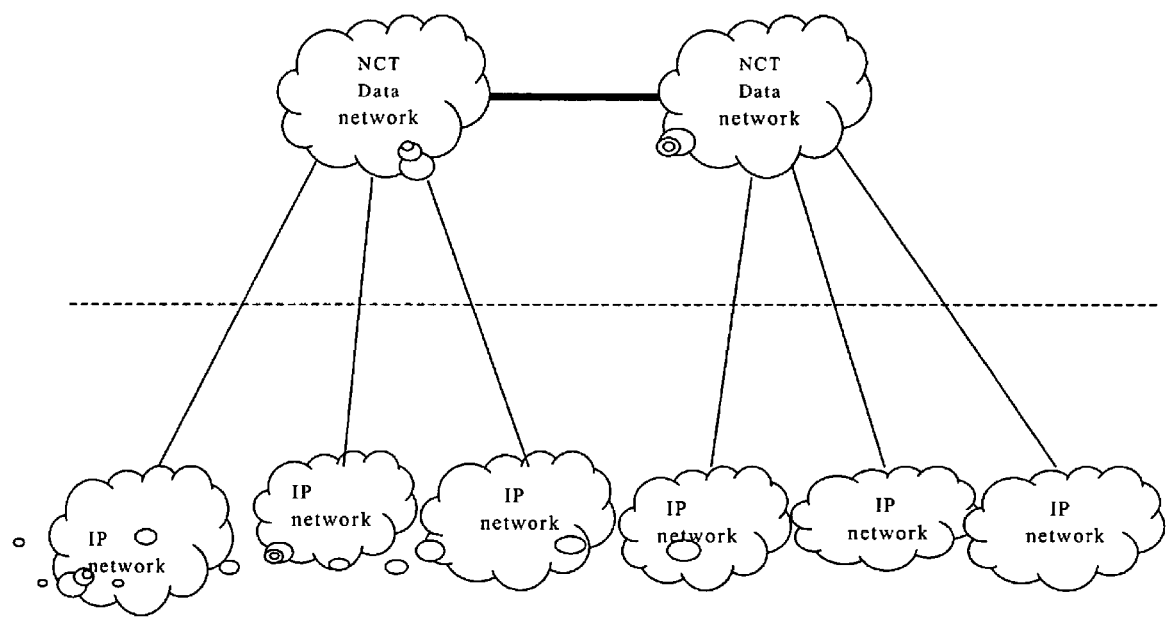
FIG. 1 is the sketch map of the architecture model of an IP Telecom Network system.

FIG. 1 is the sketch map of the architecture model of an IP Telecom Network system. Several dual-address connectionless data networks connect with each other, each NCT data network connects with several IP networks separately. Here the IP network includes (but not limits) IP metropolitan area networks, access networks and CPNs (Customer Premise Network). The real lines in the figure represent the connections between each IP network and NCT data network it belongs.

The bold lines represent the connections among each NCT data network. Within an IP telecom network described in this invention, the topology structure is separated strictly with that of the NCT data networks. Each IP network needs to establish a connection with a NCT data network, and they must set up a trust relationship between them, if there is not any trust relationship between them, an IP network can not communicate with a NCT data network; so do all the NCT data networks. In this mode, on the one hand, any IP data packet within an IP network can be guaranteed to reach any one IP network any time, on the other hand, any IP data packet can be guaranteed to be trustworthy. Therefore, a network in this connection mode has high flexibility of an IP network and meets the high security requirements of a telecom network.

Figure 2:
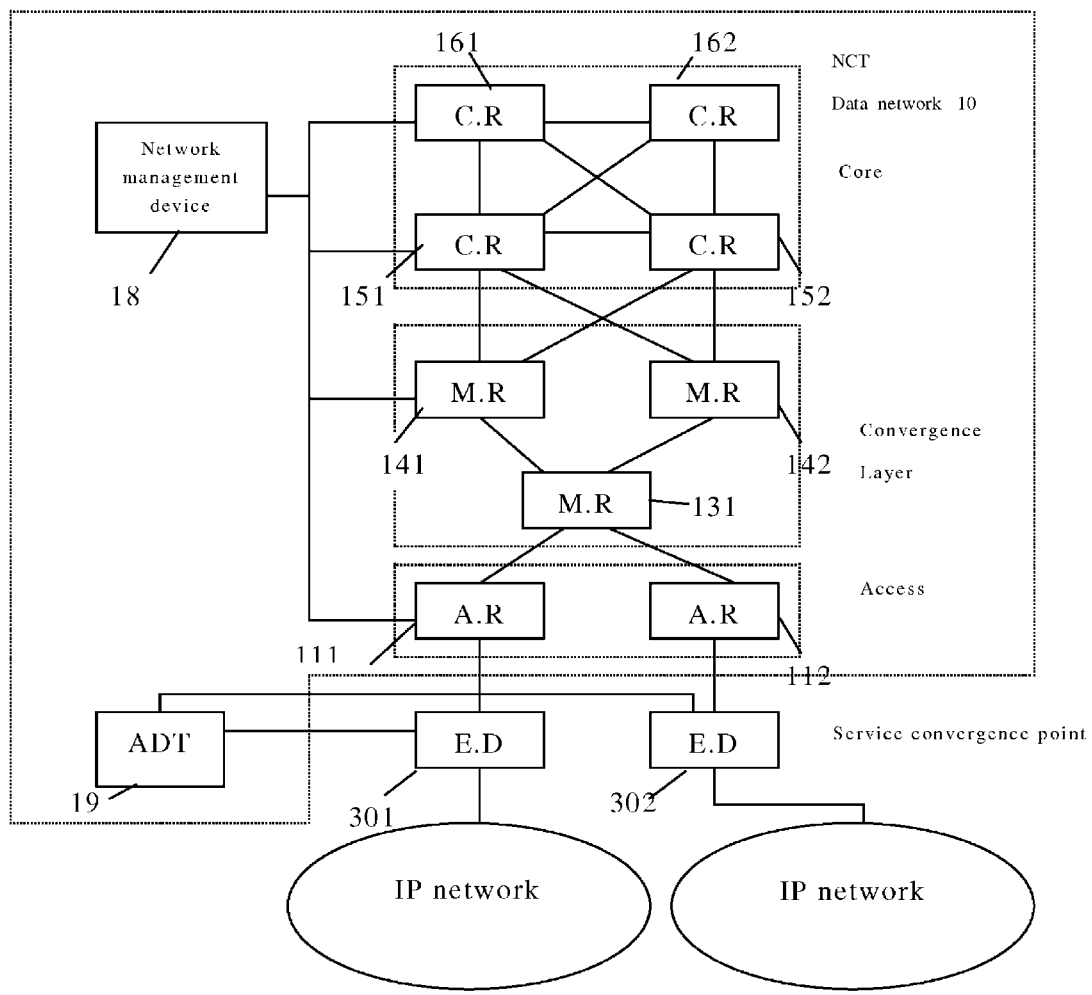
FIG. 2 is the sketch map of the structure of an IP Telecom Network system.

FIG. 2 is the sketch map of the structure of an IP Telecom Network system. In the FIG. 2, an NCT data network connects with an IP network through the EDs. All the NCT data networks communicate with each other through the core layers. Within this IP Telecom Network system, the NCT data network addresses are used to address within the NCT data networks, this data network address is different from an IP address in an IP network.

NCT data network addresses are assigned to the devices and EDs within an NCT data network, and IP addresses are assigned to the devices which connect with EDs in the IP networks and EDs according to the rules defined in the IP protocol, it means that dual-address structure is used in this IP Telecom Network, the dual-address structure is the key of this invention.

NCT data network is the main part of an IP Telecom Network; it uses both connectionless operation mode and connection-oriented tunnel operation mode. In this implementation example, an NCT is composed of a core layer, a converged layer, an access layer, the network management devices, the EDs and the ADTs. Its architecture is layered. It should be pointed out that an NCT data network with three-layer structure shown in the FIG. 2 is only for illustration, it is only a typical three-layer structure normally used in existing large network such as MAN. Of course, for the networks with different scales and different user requirements, this layered method may be changed; therefore, this three-layer structure does not limit the scope of protection for this invention. The address assignment rule used within an NCT data network may use the normal address assignment rules which are often used in existing telecom networks, i.e. to realize the addresses astringency and availability; addresses are assigned according to country, province (city), district, county or other address assignment rules according to regional layered structure.

In the FIG. 2, the core layer, the converged layer and the access layer is composed of many core layer devices CRs (151,152,161,162), many converged layer devices MRs (131, 141,142) and many access layer devices ARs (111,112). Each access layer device AR at least connects with an ED (301, 302), and connects upward with a converged layer device. All the converge layer devices connect with many access layer devices and many core layer devices, the core layer devices connect with each other and the cores layer devices within different NCT data networks may connect. In addition to it, the network management device 18 manages the access layer devices, the convergence layer devices and the core layer devices together.

ADT is a device to realize address mapping function for networks, it stores an address mapping table. The contents in an address mapping table may be the mapping relationship between IP addresses of extra networks and NCT data network addresses of the EDs, it may also be the mapping relationship between NCT data network addresses and ATM addresses or the mapping relationship between NCT data network addresses and frame relay (F.R) addresses. The contents in an address mapping table depends on the types of extra networks which connect with the EDs. The IP addresses described may be IPv4 addresses, it may also be IPv6 addresses, or other network addresses based on IP protocol. There is at least one ADT in one NCT data network, all the EDs should register to an ADT described above, and make connections to realize address translation. In addition to it, an ADT may have duplicate configuration to ensure the reliability of the system. Access layer devices may make connections with each other directly.

An ED is an edge gateway device which connects an IP network with an NCT data network. It has at least two functions, one of them is to make a translation between the NCT data network addresses and the IP network addresses to ensure the network to be used to bear existing IP data packets; another function is to converge the service streams coming from IP networks, the EDs converge the IP packets coming from extra devices of IP networks and forward them to the EDs at other side in an NCT data network, the destination EDs send them to the IP networks devices at the destination side.

Each ED has a determined NCT data network address and an IP address. Each ED knows the IP addresses of devices or IP networks connecting with it. The ED must register to a corresponding ADT, and it must be trusted by the corresponding ADT, the register procedure needs to be authenticated to validate the trust relationship between the ED and ADT. After an ED finishes register and authentication to an ADT, the ADT should store the dual-address mapping relationship of the EDs which has just registered; the dual-address mapping relationship is the associated relationship of NCT data network addresses of the EDs and devices or networks connecting with them. After the IP network addresses of the devices or networks connecting with the EDs are changed, the EDs will send all the associated relationships between the IP addresses of devices or networks which will be changed and the NCT data network addresses of the EDs to an ADT to ensure that there's an entire and right mapping table between IP addresses of networks and devices and NCT data network addresses of the EDs in an ADT.

All the devices and the EDs within a NCT data network have NCT data network addresses, the devices and networks accessing to an ED use IP addresses. It should be noticed that the devices and networks may also use ATM addresses or Frame Relay (F.R.) addresses so that this kind of NCT data network may bear ATM data packets or Frame Relay data packets. In this implementation example, we only use IP addresses as an example. This NCT data network address and NCT frame structure is used within a NCT data network and a NCT address is used to address. NCT data network addresses may be assigned following the normal assigning rules used in telecom networks to realize the addresses astringency. All the devices within a NCT data network are assigned the NCT data network addresses, each ED is identified by a NCT address. There is an entire NCT address at each header within a NCT data network, the devices within a NCT data network route based on the NCT addresses.

Figure 3:
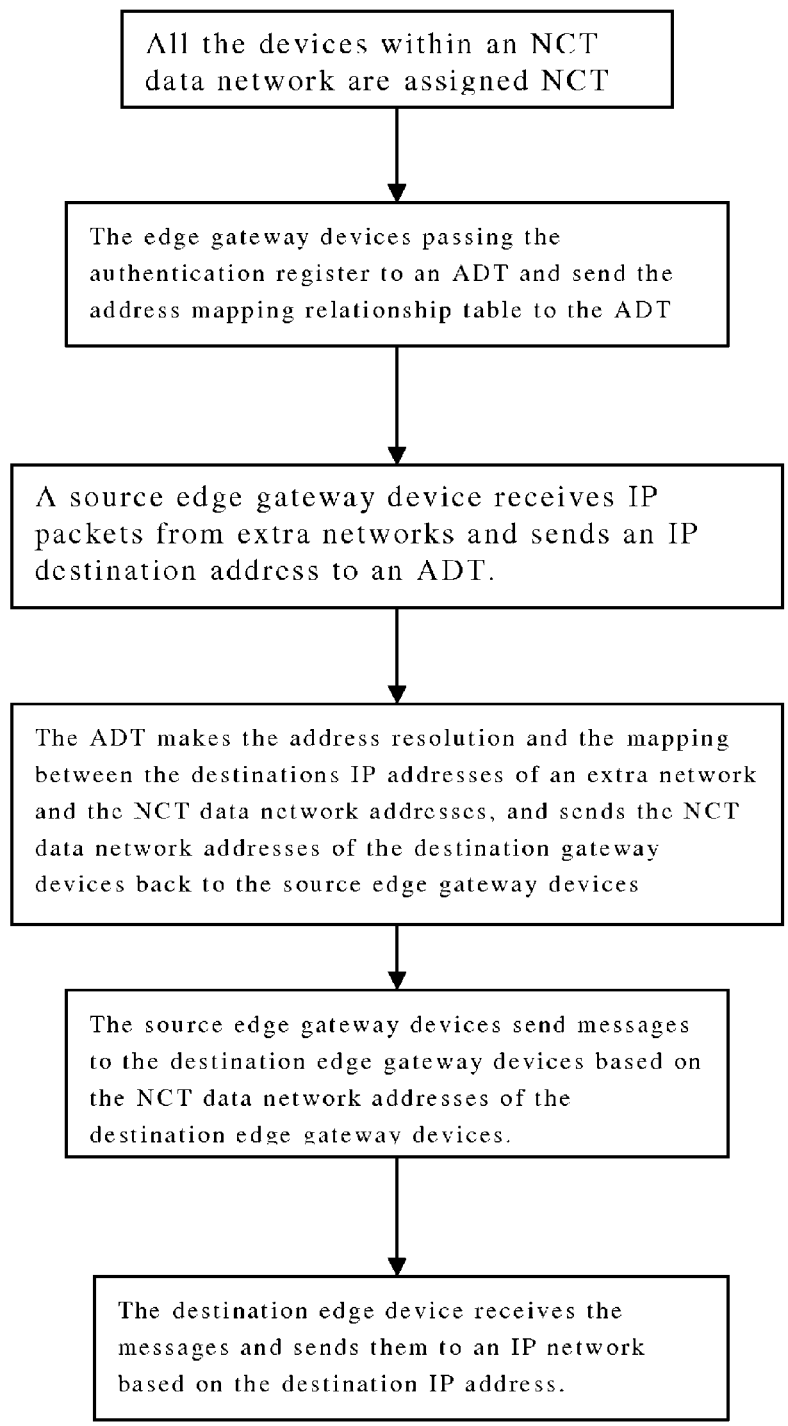
FIG. 3 is the data communication method of an IP Telecom Network system.
Figure 4:
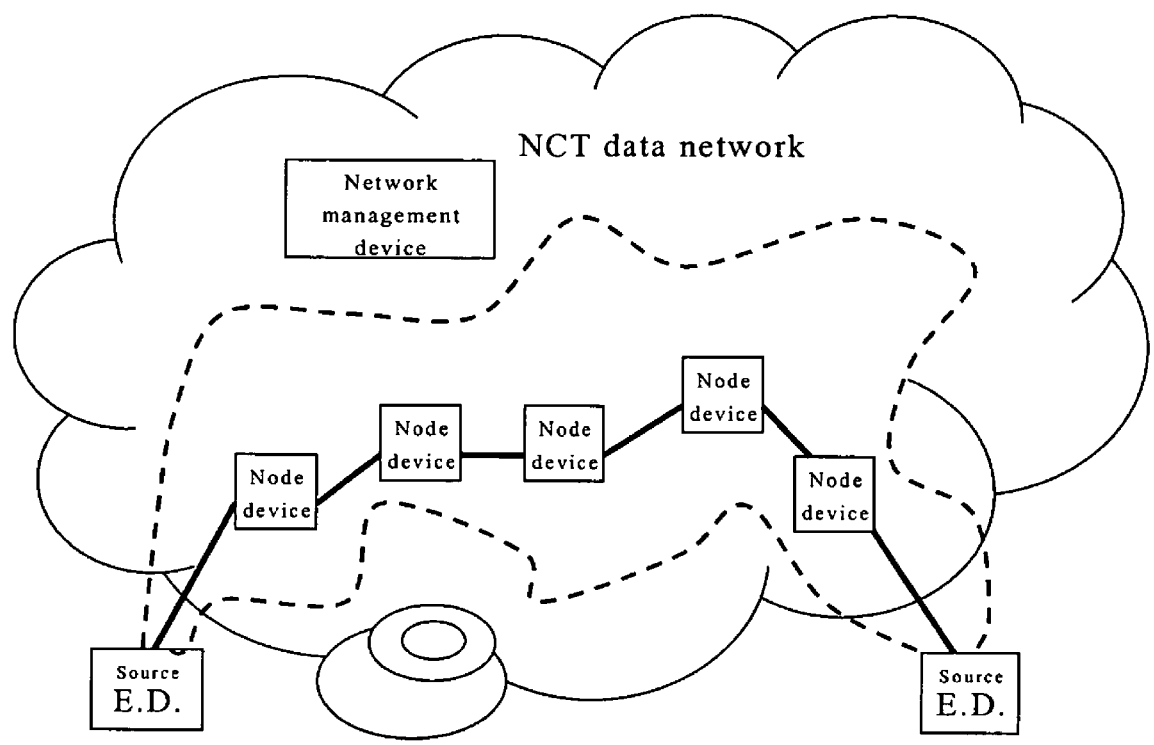
FIG. 4 is the sketch map of tunnel connection establishment within an IP Telecom Network system.

Now we describer the communications method used in an IP Telecom Network described in this invention in details, taking FIG. 3 as an example.

Step 1): All the devices within a NCT data network are assigned NCT data network addresses;

Step 2): The EDs passing the authentication register to an ADT and send an address mapping relationship table to an ADT;

Step 3): A source ED receives IP packets from extra networks and sends an IP destination address to an ADT;

Step 4): The ADT makes the address resolution and the mapping between the destinations IP addresses of an extra network and the NCT data network addresses, and sends the NCT data network addresses of the destination EDs back to the source EDs;

Step 5): The source EDs send messages to the destination EDs based on the NCT data network addresses of the destination EDs.

In this step, while working in a connectionless operation mode, there is an entire NCT address in the header of each message, all the devices in a NCT data network select routing based on the NCT addresses. While the message is sent only within an NCT data network, the ED 301 sends message to the access layer device 111 it connects with, then forwards the message to the converge layer device 131. If the converge layer device 131 determines that the message should be forwarded to the access layer device 112 based on data network NCT address, the message is sent directly to the access layer device 112, the access layer device then sends the message to the ED 302. In addition to it, the message may be forwarded to the core layer devices after it passes a convergence layer device, and it is forwarded to a destination ED layer by layer. While a message needs to be sent from one NCT data network to other NCT data network, the message coming from an ED is converged layer by layer, from access layer devices, converge layer devices to the core layer devices and is forwarded to other NCT data networks, then it is forwarded from the core layer device to the ED layer by layer. In other words, NCT data network uses a fixed routing technology or a moderate route technology, the routing technology used may be single routing, it may also be composed of one main routing and backup routing dual-routing and multi-touting. The routing which a message passes along is fixed. The dual-address within a message may use a method similar to "tunnel" technology to make address resolution, as it is a well-known technology, it will not be discussed here.

Step 6): The destination ED receives the messages and sends them to an IP network based on the destination IP address.

Using the EDs and communications method described above, the IP telecom network implemented in this invention may bear existing IPv4 packets, and it may also bear IPv6 packets or other data packets, in other words, no matter the IP addresses of the devices or networks accessing to source EDs are either IPv4 addresses or IPv6 addresses, and no matter the IP addresses of the devices or networks accessing to the destination EDs are either IPv4 addresses or IPv6 addresses, they may all make seamless communications within this IP telecom network, in this way, the seamless connection between an NCT data network and extra IP networks can be realized, and due to this communication procedure is established among the network nodes with trustworthy mechanism, the security from end to end can be guaranteed.

The routing operation method of transmitting packets between the EDs is discussed above, i.e. source EDs and ADTs make the address resolution and mapping between IP addresses and NCT addresses, and they translate the packets with IP addresses into the packets with NCT addresses. Within NCT data networks, network nodes send packets according to their determined routing rules based on the NCT addresses of NCT packets until the packets reach the destination EDs. After NCT packets reach the destination EDs, the destination EDs and ADTs translate the NCT addresses into IP addresses to resume the NCT packets to the IP packets, and then the IP packets are transmitted by IP networks. This packet transmission method is the basic operation method of the IP Telecom Networks. But, an IP telecom network may also have the operation mode which uses a connection-oriented tunnel established within a NCT to realize communications. This NCT tunnel uses the same logical virtual circuit technology idea as the tunnels used in existing telecom networks, but there are obvious differences between their implementation mechanisms. The operation mode of realizing communications using an NCT tunnel is described in details as follows.

Figure 14:
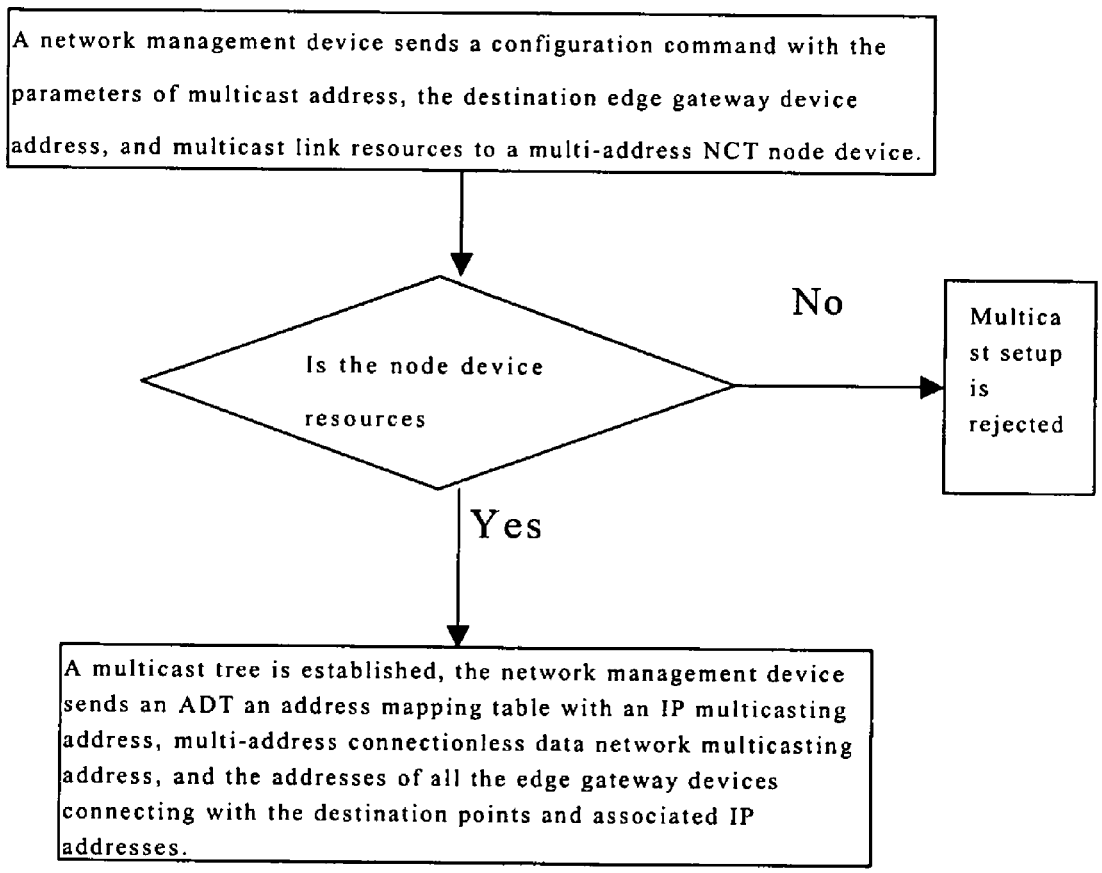
FIG. 14 is the flow chart of multicast tree establishment for the method shown in the FIG. 13.
Figure 15:
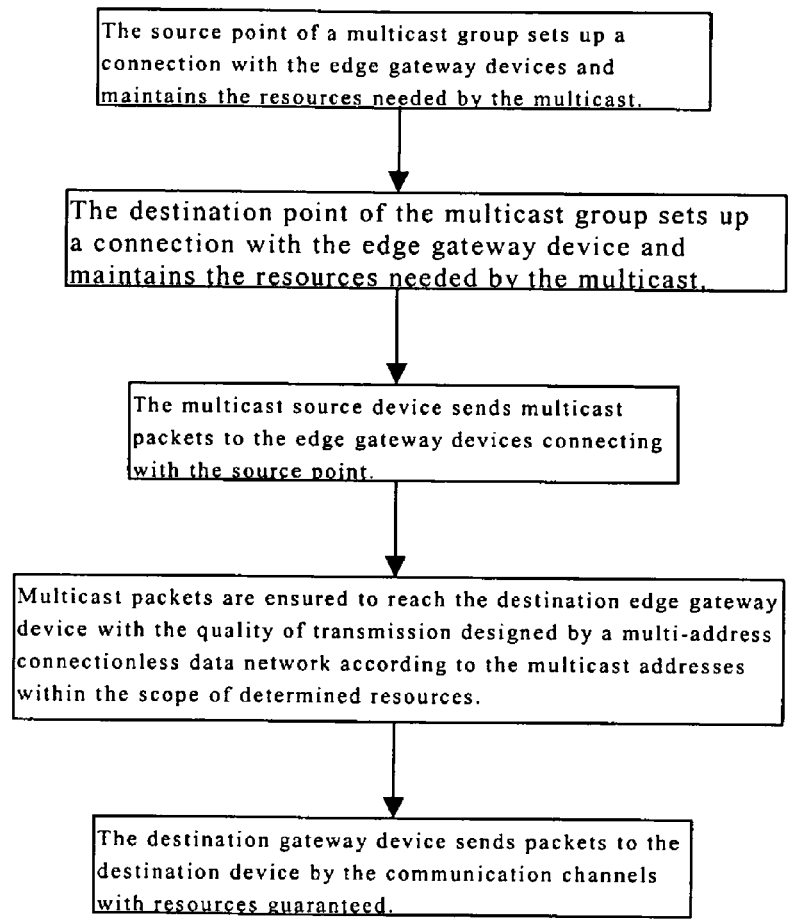
FIG. 15 is the flow chart of multicast communication procedure for the method shown in the FIG. 13.

Within an IP telecom network system, the key of the method to realize communications using NCT tunnels is to set up many logical virtual circuits, each logical virtual circuit is determined by EDs at both sides and many node devices locating in the data networks, the virtual circuits are assigned to use by different users. As shown in the FIG. 14, the lines represent the logical virtual circuits determined by the tunnels, and the dashed lines represent the different paths passed by packets while working in traditional routing operation methods. This logical virtual circuit is established based on the commands issued by network management devices within NCT data networks, once the virtual circuits are established, they are fixedly assigned to some users to use some special communications services, such as voice services, data services, until the network management device issues a command to cancel this logical virtual circuit, during the period of this virtual circuit exist, if some communications service is assigned to be provided in this logical virtual circuit, then the devices in the IP network participating in this service firstly sends IP packets to an ED at one side of this logical virtual circuit, the IP packets bearing communications services reach this ED device using the routing mechanism in the IP network, the IP packets are changed into the NCT data frames and are transmitted according to the path determined by this logical virtual circuit, until they reach an ED at the other end of routing. NCT data frames are resumed to IP packets by the ED at the other end and the IP packets are sent to the final destination of the communications service using the routing mechanism of IP networks, within this procedure, the packet transmission path within an NCT data network is fixed. This kind of fixed path as a kind of virtual circuit is named as tunnel" in telecommunications field, so, we call the virtual circuit realized within an NCT data network above the NCT tunnel.

It should be pointed out that though an NCT tunnel above and the current tunnels as those in a VPN, are both based on logical virtual circuit technical idea, but, their implementation mechanism is different. Within a VPN, the header enveloping technical solution is used to send the data frames needed to transmit though a tunnel, i.e. at the entrance of a tunnel, a new IP header identifier is added to the header of data frame, this data frame enveloped is transmitted through a tunnel, at an exit, this IP header is cancelled, the initial packet is come back and is sent to a destination. For IP telecom network, the tunnel is within an NCT data network, this data network takes layered architecture, and it is managed by the network management devices. Therefore, the data frame within the tunnel does not rather take the header identifier enveloping method than use short connection ID to replace the redundant NCT addresses, this method simply uses the character of the NCT data network management mechanism to save the address overheader and improve the efficiency of transmission. That is why the so-called 1 virtual circuit in this invention is named as NCT tunnel.

Figure 5:
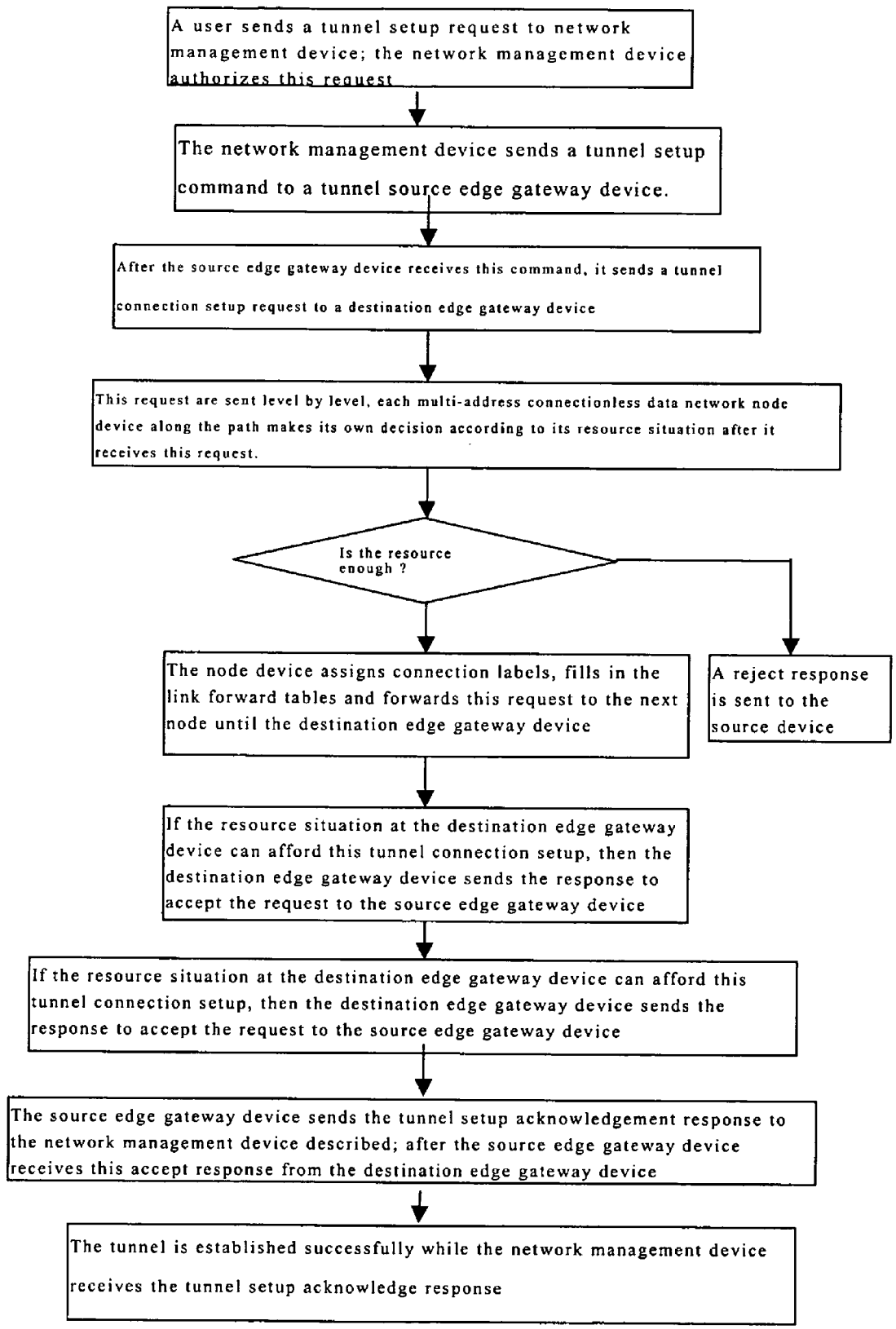
FIG. 5 is the sketch map of operation flow of tunnel establishment procedure.

As shown in the FIG. 5, within an IP telecom network system, the procedure to set up a tunnel to realize communications is as follows:

Before a tunnel is established, what is needed to do is before all the IP telecom networks operate: all the devices and each ED within an NCT data network are assigned a NCT address. This procedure is discussed in the context, it is not discussed here.

If a user needs to send some communication service data, first of all it sends a tunnel setup request to a network management device within an IP telecom network. After the network management device authenticates this request according to its internal operation rules determined, the network management device sends a tunnel set up command with the parameters of a destination address, a class of the service, resource requirements etc. After the source ED receives this command, it sends a tunnel connection setup command with the parameters of resource requirements, a class of service and a connection sequence number etc, to an ED at a destination of the tunnel, using an NCT data network command. This command is sent according to the existing routing mechanism within an NCT data network level by level, all the NCT data network node devices make a decision based on their own resources situation, after they receive the tunnel set up request deriving from this command, if their resource meets the requirements, they configure links resources based on this request, and assign a connection ID, fill in an link forward table and forward this request to the next node until the request reaches the ED at the destination. If the destination ED's resource situation affords to set up this tunnel connection, the destination ED sends an accept response. As soon as the source ED receives the accept response, it returns a tunnel setup acknowledge immediately. After the network management device receives the tunnel setup acknowledge from the source ED, it sends a command to an ADT, the tunnel is established successfully while the network management device receives the acknowledge response from the ADT.

After a tunnel is established, all the IP packets of this user's this type of communications services are transmitted in the logical virtual circuit determined according to the link transfer table when they pass the NCT data network.

During the procedure of the tunnel establishment, while a source ED sends a tunnel connection setup request to a destination ED, it may also sends the request using a backup routing of an NCT data network to set up both main and backup tunnels. Once there is something wrong for the main logical virtual circuit, the backup logical virtual circuit may be started in time to ensure the data to be sent out.

In addition, if the resource situation of the node devices or the destination EDs along can not afford to establish this tunnel, the node devices or the destination EDs along which resource can not meet the requirements send a reject response to the source ED, this tunnel configuration is not available, and the source ED returns a tunnel establishment failure response. While the source ED sends the tunnel setup request, timer starts to time, if the accept/reject response is not received until the timer is overtime, this configuration is invalidation. The tunnel establishment is unsuccessful in these two situations above.

From the discussions above, the tunnel in an IP telecom network is only a "virtual circuit" logically, as a tunnel in an existing VPN. Its establishment and cancellation procedure does not need any physical operation; therefore, a network management device may complete the establishment and cancellation procedure automatically: While a user needs to set up a tunnel, a tunnel connection is established automatically, and while a user does not need the tunnel, the tunnel connection is cancelled automatically.

Figure 6:
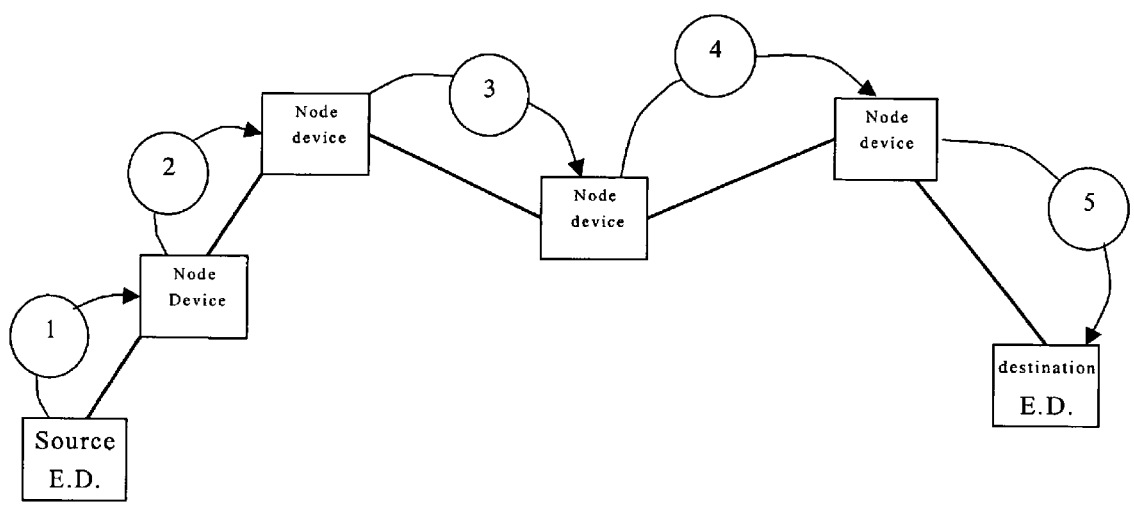
FIG. 6 is the sketch map of procedure of exchanging connection IDs among different nodes during the packets transmission in a tunnel.

As shown in the FIG. 6, the digitals in the circles response the connection IDs. This connection ID is not an end to end address, it is only available within local area, it is only a link connection identifier between point (a node device) to point (a node device), an ID is not available in global area, therefore, comparing with the global address of network layer, the length of a connection ID is less than that of a network layer address. As mentioned above, within an IP network, an ED and an ADT add a NCT address in front of the IP address of an IP packet and change the IP packet into a NCT packet to send it within a NCT data network after an IP packet reaches an ED. Within an NCT packet, pre-IP packet is still maintained as the packet payload itself. During the procedure of communications through a tunnel, the corresponding relationship between the NCT addresses and connection identifiers is established at the same time of a tunnel establishment, this corresponding relationship is stored in the source ED, the destination ED and node devices along the tunnel, and it is not changed from the time when tunnel is established till the tunnel is disconnected. In this way, a global address can be replaced by a connection ID within a NCT data network. When a NCT packet transmits in a tunnel, its NCT address in an NCT data frame is replaced by a connection ID between this ED and the node device at the next level. In this way, it is the NCT data frames that transmits in a tunnel, after a node device at the next level receives the NCT data frame of NCT above, it deletes the data frame connection ID and replaces the ID with the determined connection ID between it and the node device at the next level, then NCT data frame continues to be transmitted in the tunnel until it reaches a destination ED. This data frame is changed back to an IP packet and forwarded to the IP network by the destination ED. In this way, a long NCT address is replaced by a short connection ID to save the address spending and improve the transmission efficiency of the network when a packet transmit in a tunnel.

After the tunnel operation method is realized in an IP telecom network, the basic communication mode between users is as follows:

A source IP user sends an IP packet, this IP packet reaches a source ED connecting with this IP user through an IP network;

The source ED receives this IP packet and sends its IP destination address of this IP packet to an ADT;

(3) Address resolution and mapping between the IP destination address and the NCT data network address of the destination ED is done by an ADT, when there is a tunnel connection between the source ED and the destination ED, the information including the source/destination IP address, source/destination NCT address, the class of service etc. received is sent back to the source ED, and this tunnel connection is started up by the source ED;

(4) The source ED sends a data frame changed from this IP packet to the next level node device according to the logical virtual circuit determined by this tunnel connection, from now on, the data frame is sent to the destination ED level by level. During this procedure, corresponding connection IDs are exchanged between all the node devices and all the EDs along the path which the packet passes according to the method described above.

(5) After the destination ED receives this data frame through the tunnel, it resumes the data frame back to an IP packet and forwards the IP packet to an IP network based on the destination IP address.

The special methods to realize a VPN and multicast used in the IP telecom network described in this invention are further introduced as follows.

There are two types of VPN for an IP telecom network system, one is IP VPN, and the other one is NCT VPN. IP VPN is established based on a group of IP addresses and the relationship between their flux and their flow directions to establish a VPN meeting the responding requirements; NCT-VPN is established to meet the responding requirements. NCT VPN is mainly used to provide transparent private service VPN. These two types of VPN are both realized through EDs and ADTs. To set up a VPN within an IP telecom network system, special domains are maintained within a NCT packet: VPN identifier domain, VPN number domain. VPN identifier domain represents if the packets transmitted in an NCT network belong to some VPN, and the VPN number domain represents to which VPN this packet belongs. These two domains provide the facility to set up an IP telecom network system.

Figure 7:
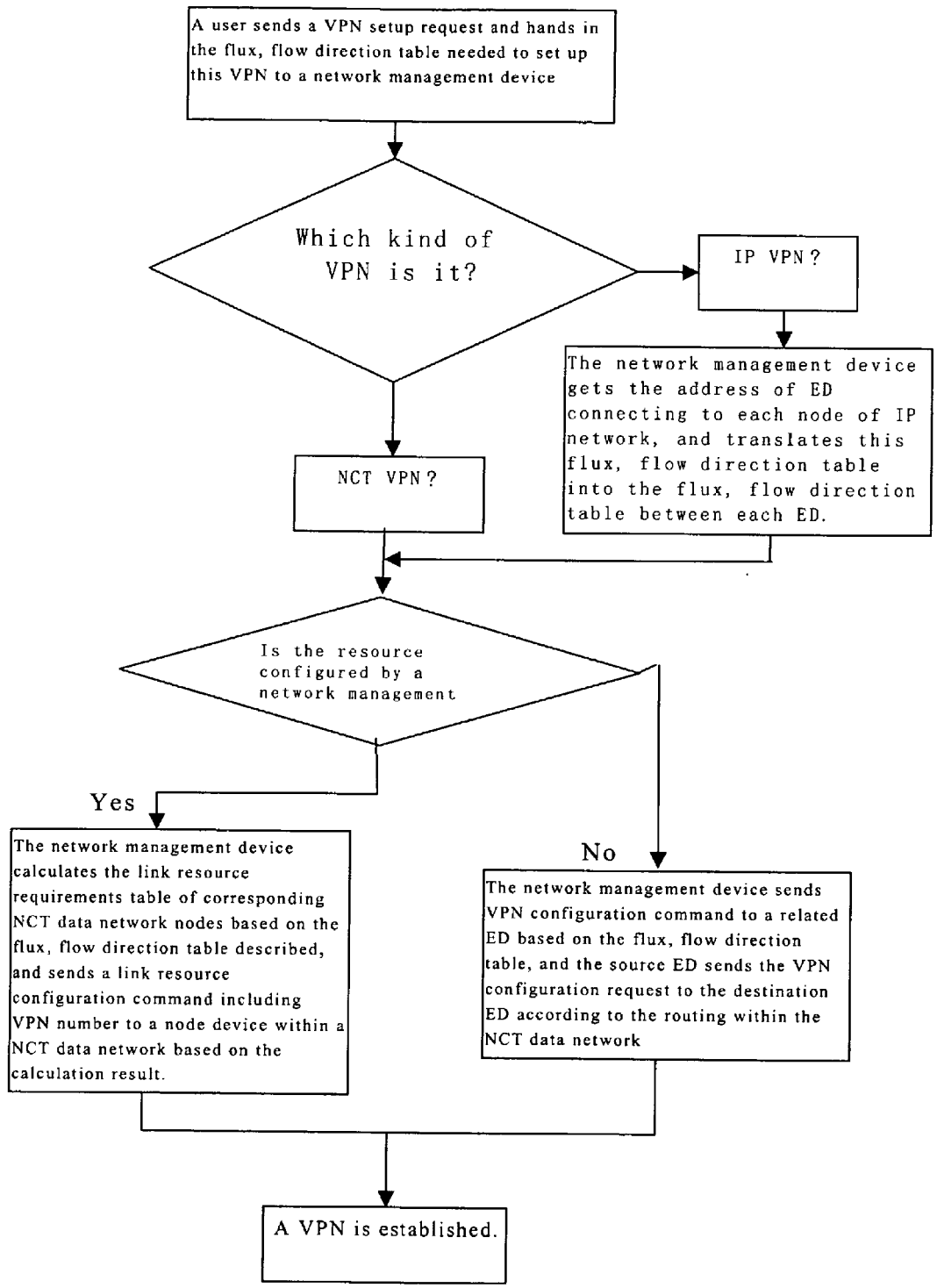
FIG. 7 is the flow chart of implementing a VPN in an IP telecom network system.

The general flow chart to realize a VPN in an IP telecom network system is shown in the FIG. 7, which includes the following steps:

(1) A user sends a request to a network management device to set up a VPN and hands in its flux and flow direction table needed by this VPN;
(2) To determine which type of VPN it belongs to based on the flux and flow direction table.

If this VPN is an NCT VPN, then the flux and flow direction table is the flux and flow direction table among EDs, go to the step (4); if it is an IP VPN, then the flux, flow direction table is the flux, flow direction table of the nodes within an IP network, go to the step (3);

The network management device gets the address of an ED connecting with each IP network node through an ADT, and the flux, flow direction table is changed into the flux, flow direction table among each ED, go to the step (4);

To determine if the resource is configured by a network management device.

(5) If the answer is yes, then the network management device calculates the link resource requirement table of corresponding NCT data network nodes based on the flux, flow direction table described, and a VPN is established based on the link resource configuration including a VPN number sent to node devices within the NCT data network according to the calculation result.
(6) If the answer is no, then the network management device sends a VPN configuration command to related ED based on the flux, flow direction table, and the source ED sends a VPN configuration request to a destination ED according to a routing within the NCT data network, a VPN is established based on it. The integral procedure above is divided into two cases, one is to realize a VPN within a NCT data network and the other is to realize a VPN within an IP network, they are described in details as follows.

The procedure to realize a VPN within a NCT data network includes the following steps:

1 Request a VPN:
First of all, a user who requests to set up a VPN sends a request to establish a VPN to a network management device and provides the flux, flow direction table needed by this VPN.

2 To Establish a VPN

There are two technical solutions to set up a NCT VPN.

Figure 8:
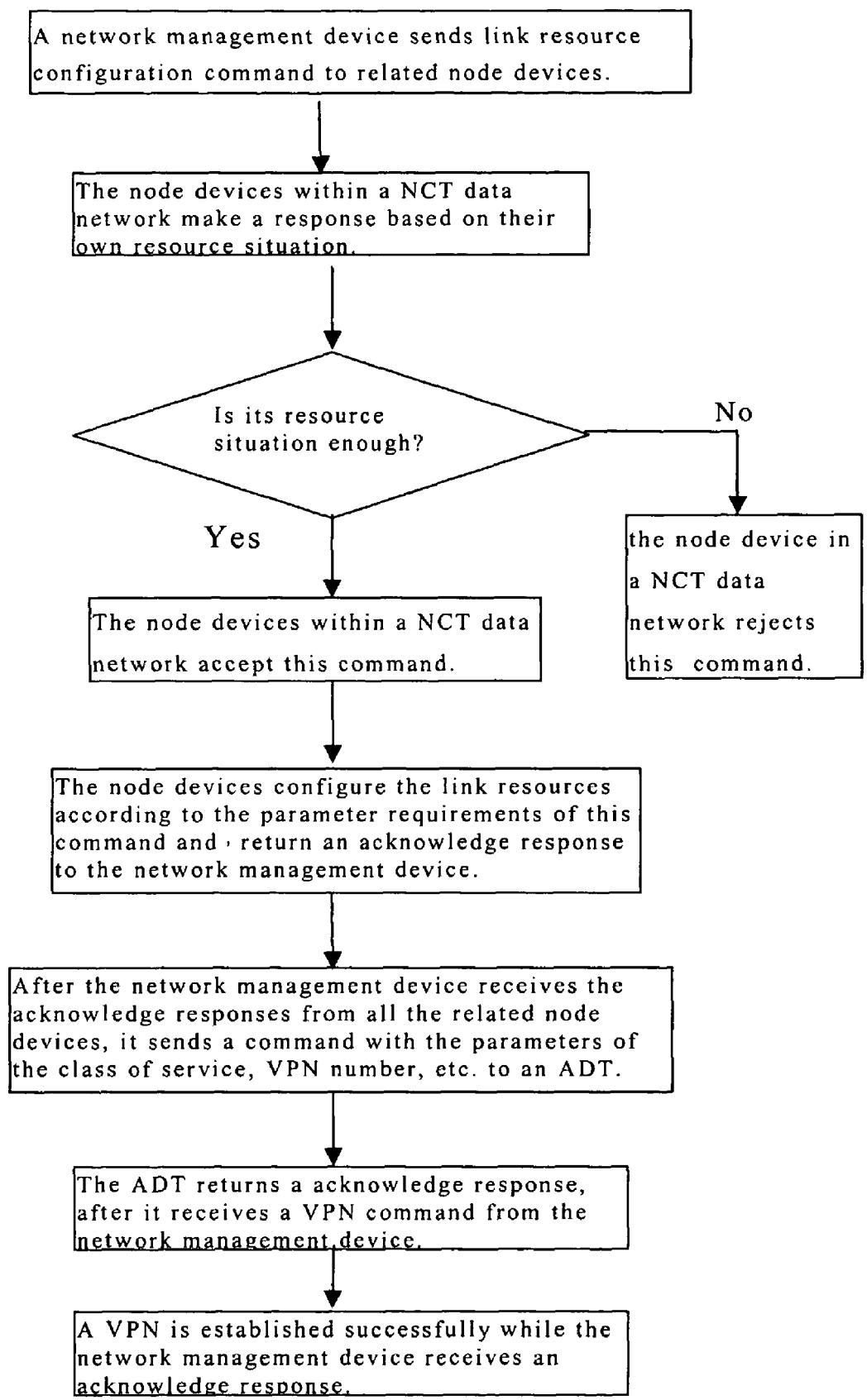
FIG. 8 is the flow chart of the first method to establish a NCT VPN.

The first technical solution is shown in the FIG. 8, it includes the following steps: A network management device calculates the link resource requirement table based on the flux, flow direction table among EDs in a VPN submitted by a user, the network management device determines the VPN number based on the calculation result above, and sends a link resource configuration command including the parameters such as, the class of service, VPN number etc.

The node devices within a NCT data network make a response based on their own resource situation; if their resource situation affords to set up this VPN, then the node devices within a NCT data network accept this command, and configure the link resources according to the parameter requirements of this command, and return an acknowledge response. After the network management device receives the acknowledge responses from all the related node devices within the NCT data network, it sends a command with the parameters of the class of service, the VPN number, etc. to an ADT. The ADT returns an acknowledge response, after it receives a VPN command from the network management device. The VPN is established successfully while the network management device receives an acknowledge response.

If the resource situation does not afford to set up this VPN, then the node device in a dual-address connectionless data network rejects to this command, this configuration is not available. A VPN is not established.

A VPN with the quality of service guarantee may be realized using this method. A network management device configures and controls VPN establishment, and the VPN resource can be optimized, and it is easy to set up a fixed or most optimized VPN, the VPN establishment is fast.

Figure 9:
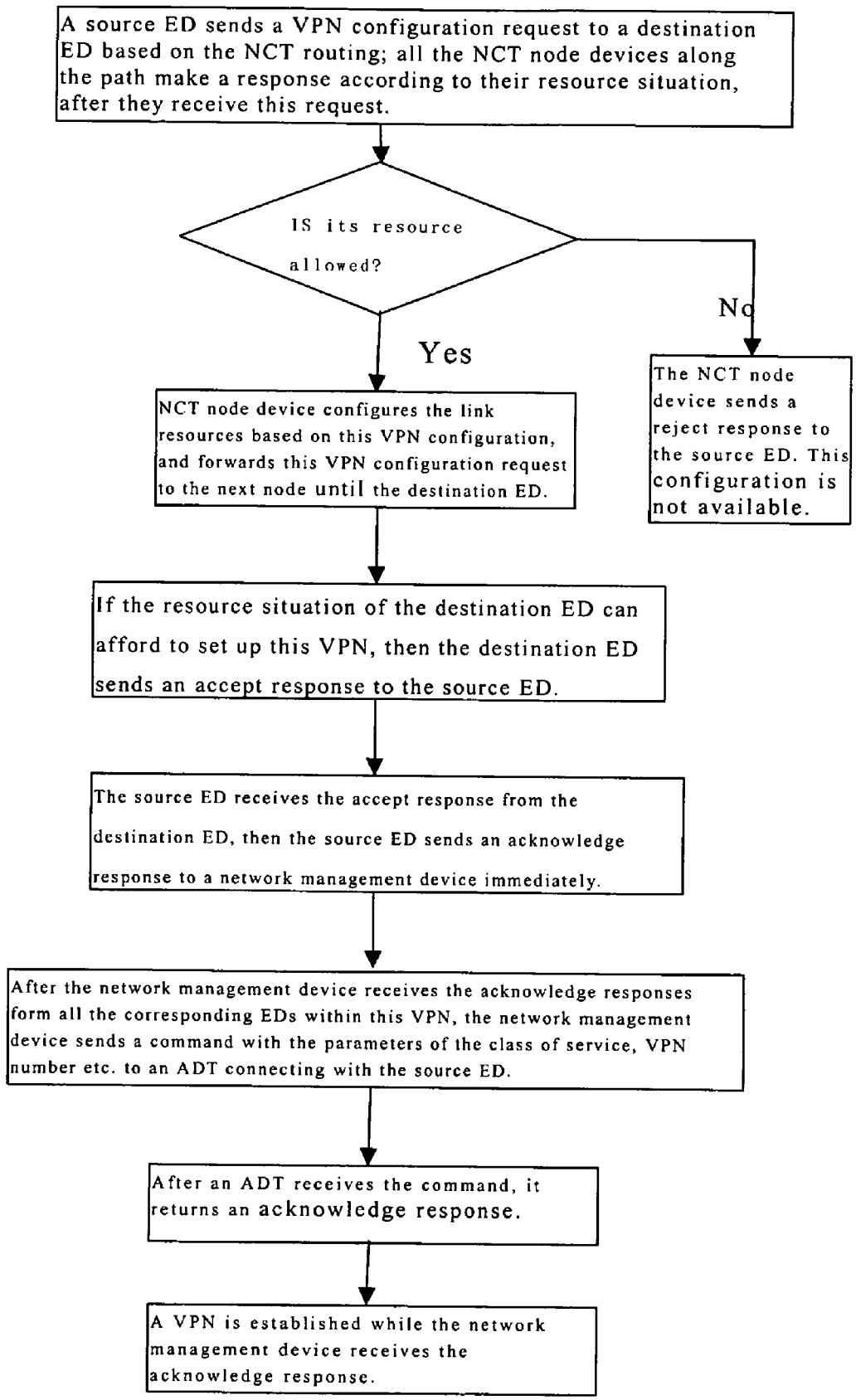
FIG. 9 is the flow chart of the second method to establish a NCT VPN.

The second technical solution is shown in the FIG. 9, it includes the following steps: A network management device sends a VPN setup command to this source ED, this command includes the parameters of the VPN service class, the VPN number, the source ED address/destination ED address, etc.

The source ED sends a VPN configuration request to a destination ED based on an NCT main routing, or, the VPN configuration request is sent using an NCT backup routing. All the NCT node devices along the path make a response according to their resource situation, after they receive this request: if their resource situation can afford to set up this VPN, then NCT node devices configure the link resources based on this VPN configuration, and forward this VPN configuration request to the next node until it reaches a destination ED; if the resource situation of the destination ED can afford to set up this VPN, then the destination ED sends an accept response to the source ED. If the source ED receives the accept response from the destination ED, then the source ED sends an acknowledge response to the network management device immediately. After the network management device receives all the acknowledge responses of corresponding EDs within this VPN, the network management device sends a command with the parameters of the class of service, VPN number etc. to an ADT connecting with the source ED.

After the ADT receives a command from a network management device, it sets up a mapping table including the VPN number, the class of service and the destination ED address, then it sends back an acknowledge response. A VPN is established successfully while the network management device receives this acknowledge response.

If the resource situation of the node device or the destination ED, can not afford to set up this VPN, then the NCT node device or the destination ED sends a reject response to the source ED. This configuration is not available. If the timer of the source ED is overtime, or the source ED does not receive an accept/reject command, this configuration is not available either for the source ED. For the two situations above, VPN establishment fails.

Using this method, a VPN can be established based on current network situation, this method is that a VPN is set up through each node forwarding the VPN configuration request, after the source ED sends a VPN configuration request.

Figure 10:
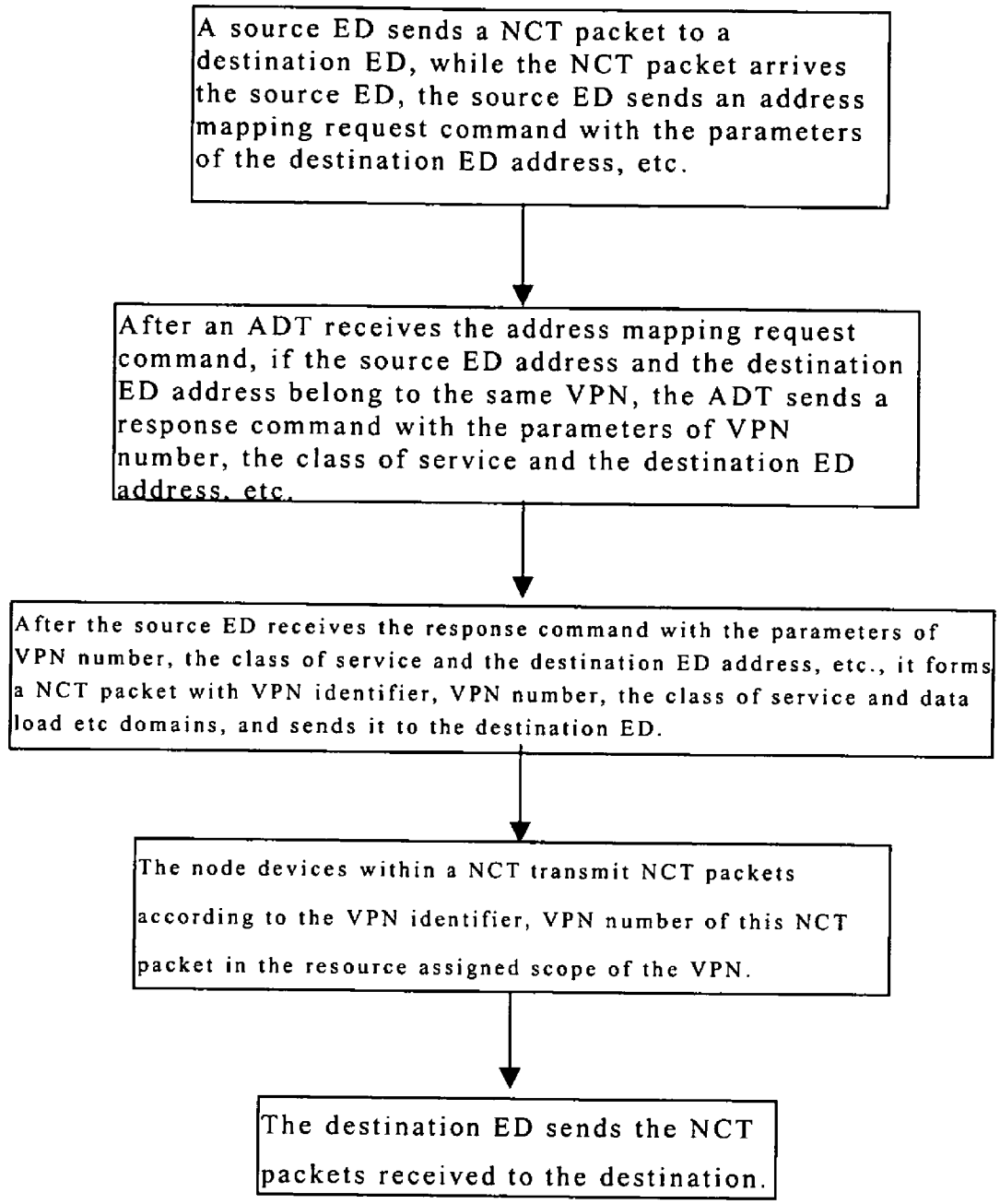
FIG. 10 is the flow chart of communication procedure within a NCT VPN.

3 Communications procedure:

The communication procedure within an NCT VPN is shown in the FIG. 10:

A source ED sends a NCT packet to a destination ED, while the NCT packet reaches the source ED, the source ED sends an address mapping request command with the parameters of the destination ED address, the class of service, etc.

After an ADT receives the address mapping request command, if the source ED address and the destination ED address belong to the same VPN, the ADT sends a response command with the parameters of the VPN number, the class of service and the destination ED address, etc.

After the source ED receives the response command with the parameters of the VPN number, the class of service and the destination ED address, etc., it forms an NCT packet with the VPN identifier, the VPN number, the class of service and data payload domains etc., and sends it to a destination ED.

The node devices including AR, MR, CR etc. within a NCT sends NCT packets to a destination ED according to the VPN identifier, the VPN number of this NCT packet.

The destination ED sends the NCT packet received to the destination.

Figure 11:
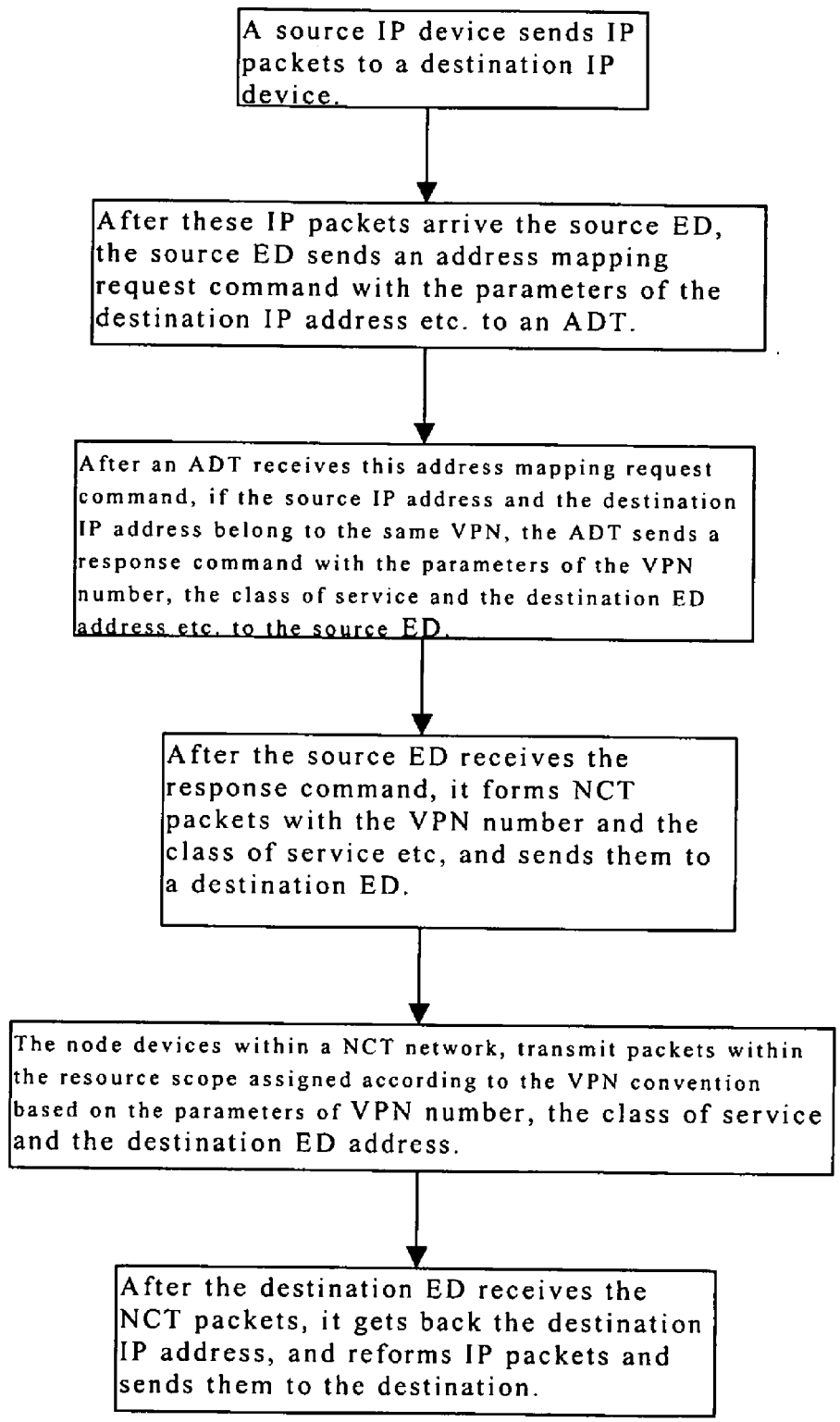
FIG. 11 is the flow chart of communications procedure within an IP VPN.

The implementation procedure of an IP VPN participated by users in an IP network, is as follows:

1 Users in an IP network hand in the flux, flow direction table of this IP VPN to a network management device through the source ED.
2 After the network management device receives the flux, flow direction table handed in by the users, it sends an address resolution request to an ADT, and makes a resolution to the NCT address of corresponding ED. Then, the network management device transfers the flux, flow direction table between IP devices into the flux, flow direction table between the corresponding EDs.
3 The VPN establishment procedure within a NCT data network is the same as the NCT VPN establishment procedure described above.
4 All the IP devices within this IP VPN set up connections with the EDs using a tunnel technology or current VPN technology etc, until this IP VPN is established.
5 The communications procedure of IP VPN:

This communication procedure is shown in the FIG. 11, it includes the following:

A source IP device sends an IP packet to a destination IP device.

After this IP packet reaches a source ED, the source ED sends an address mapping request command with the parameters of the destination IP address etc. to an ADT.

After the ADT receives this address mapping request command, if the source IP address and the destination IP address belong to the same VPN, the ADT sends a response command with the parameters of the VPN number, the class of service and the destination ED address etc.

After the source ED receives the response command with the parameters of the VPN number, the class of service and the destination ED address etc., it form an NCT packet with the VPN number and the class of service etc, and sends it to the destination ED. The node devices including the AR, MR, CR etc. within a NCT network, send the packet within the resource scope assigned according to a VPN convention based on the parameters of VPN number, the class of service and the destination ED address.

After the destination ED receives the NCT packet, it gets back its destination IP address, and reform an IP packet and sends it to the destination.

In one word, comparing an IP VPN with an NCT VPN, IP VPN is a kind of VPN among IP devices which is set up based on the flux, the flow direction table among the IP devices within an IP network, where, IP devices may be IP devices with fixed IP addresses, they may also be a CPN within an IP network, etc. IP devices connect with corresponding EDs using a tunnel or the current VPN technology such as MPLS, VPN or IPsec VPN etc. The access points of an IP VPN are an IP network. The access points of NCT VPN are EDs.

Figure 12:
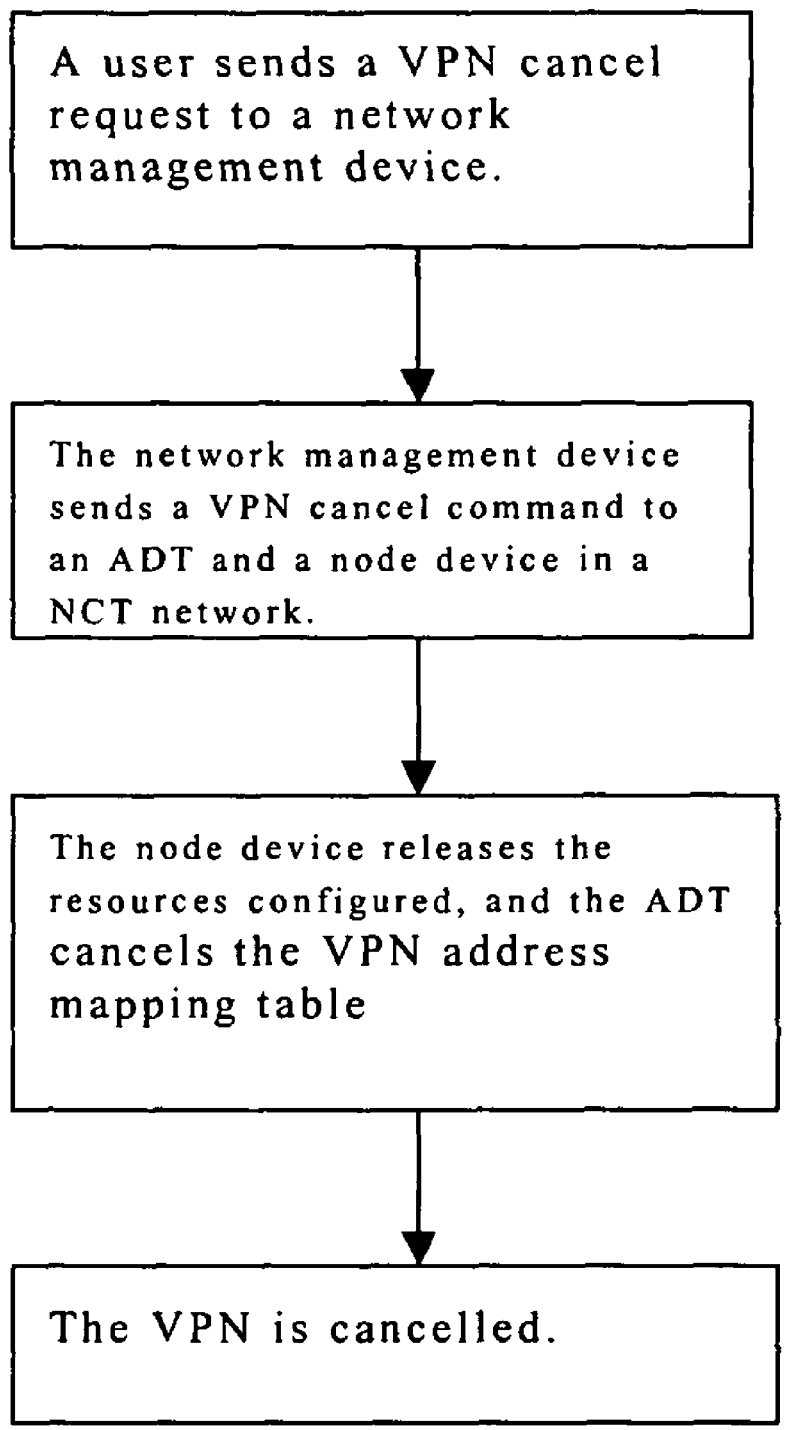
FIG. 12 is the flow chart of a VPN canceling procedure.

The procedure of canceling a VPN is shown in the FIG. 12, it includes the following steps: A use requests to a network management device to cancel a VPN, the network management device sends a VPN cancel command to a node device in a dual-address connectionless data network and an ADT, the node device in the dual-address connectionless data network releases the resources configured, and the ADT cancels the VPN address mapping table, the VPN is cancelled.

In real services, several VPNs need to be established, for example, within a large scale enterprise internal network, according to the service requirements, at least 3 VPNs need to be established, one of them is used for internal Office Automation (OA), another one is used to set up a core data network internal an enterprise, the last VPN is used to provide video conference service. Therefore, it is necessary to manage different VPN services using numbering. This is why we maintain a domain for VPN number within a packet, as discussed before. This VPN number is exclusive within a NCT network. Within an NCT data network, different classes of services may have the same VPN number, i.e. there are as many as at most "VPN number the classes" of services VPNs within an operational network.

When a VPN is established among two or more than two NCT data networks, this VPN number may be different within different NCT data networks, the core layer device CRs in the middle of a NCT data networks have the responsibility of mapping the VPN numbers From the discussion above, we can know that the procedure to set up a VPN inside an NCT data network is the most key part within the method to set up a VPN in an IP telecom network system, for the IP nodes outside an NCT data network, if they want to join some VPN, the transformation work of packet addresses is the key technical part. Therefore, for the ATM packets and Frame Relay (F.R.) packets, if there is a mapping table between ATM addresses or frame relay address and NCT addresses within an ADT and the translation work is done in an ED, ATM or frame relay VPN can be realized.

The VPN implementation procedure is described above, we introduce the special method to realize multicast within an IP telecom network.

An IP telecom network includes at least one NCT data networks using NCT data network addresses and IP networks using IP addresses. Therefore, the multicast within an IP telecom network should be realized across networks (IP networks and NCT networks). In this case, there are two kinds of multicast within the data networks in an IP telecom network system: one is that a user requests a network management device to set up a multicast, another one is that the multicasting is initiated by an IP network user. During a user requests to initiate a multicast, because it is IP packets that transmit in an IP network, and it is the NCT packets that transmit in NCT data networks, an address translation procedure is needed during IP packets and NCT packets are transmitted across networks. This is the key technical step to realize multicast in this IP telecom network system.

Figure 13:
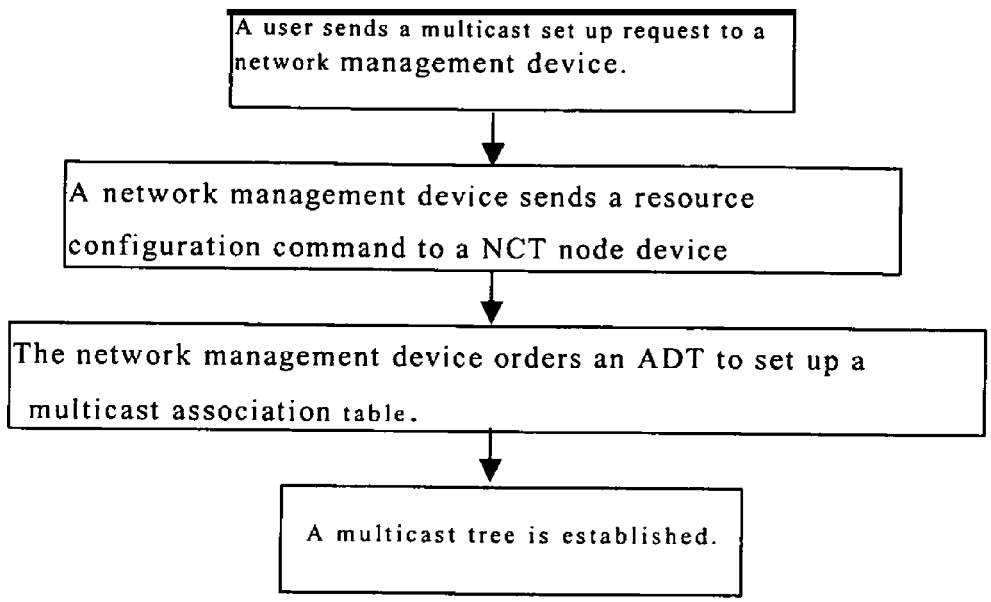
FIG. 13 is the flow chart of a multicast realization method requested by a user within an IP telecom network system.
Figure 16:
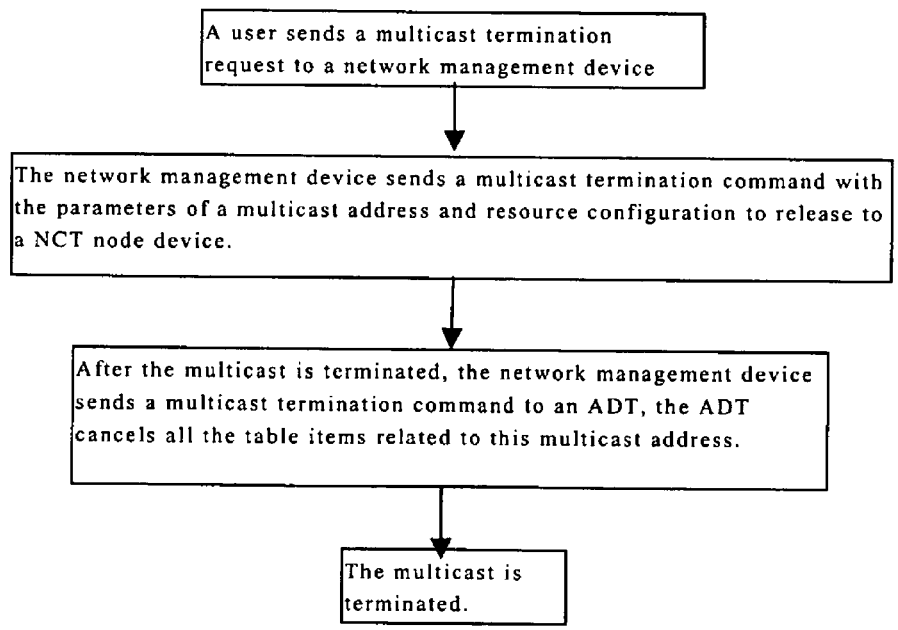
FIG. 16 is the flow chart of multicast termination for the method shown in the FIG. 13.
Figure 17:
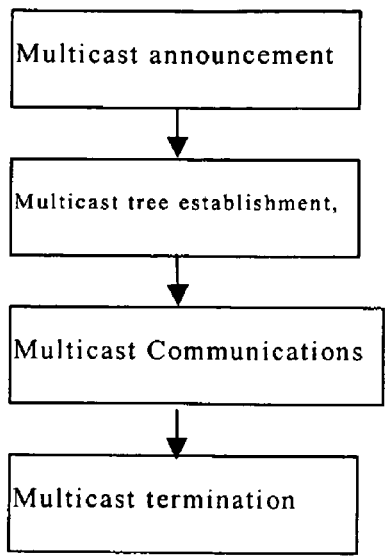
FIG. 17 is the flow chart of multicast oriented by an IP network user in an IP telecom network system realization method.
Figure 18:
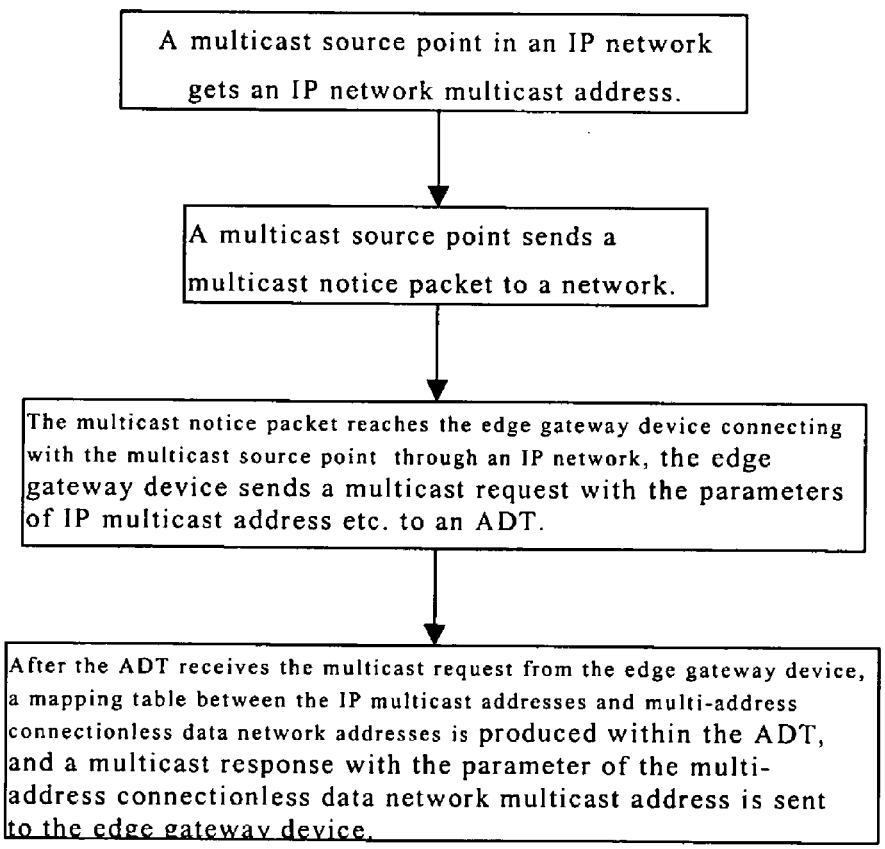
FIG. 18 is the flow chart of multicast announcement procedure for the method shown in the FIG. 17
Figure 19:
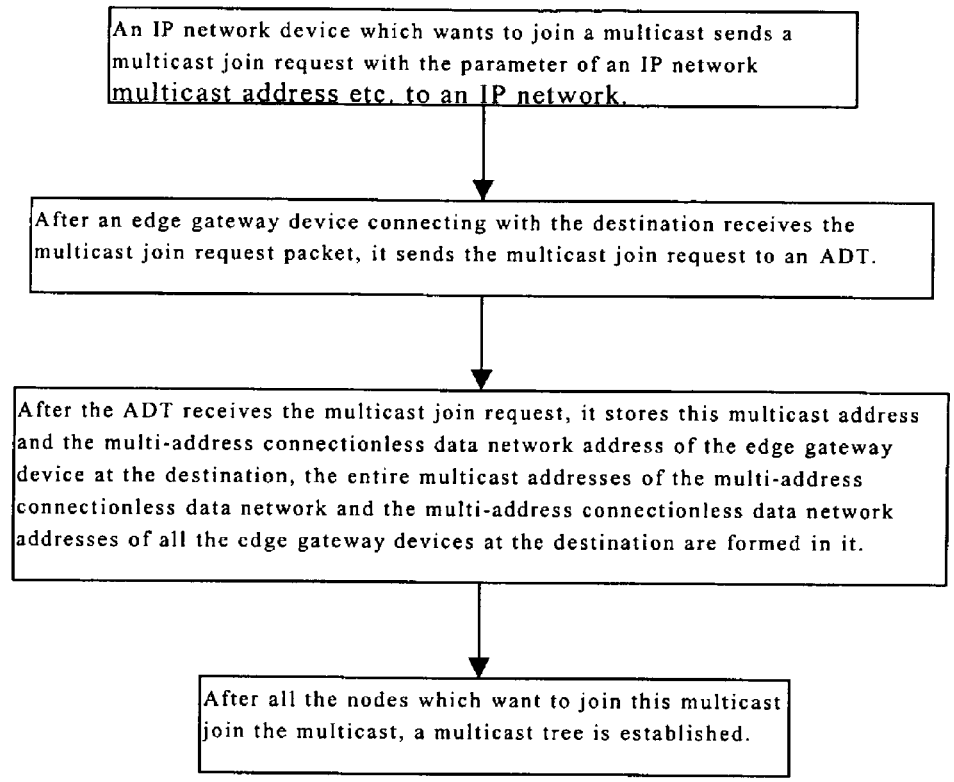
FIG. 19 is the flow chart of multicast tree establishment procedure shown in the FIG. 17

Under the situation when a user requests a network management device to initiate a multicast, four fields are defined within the packet format: a multicast identifier field, a class of packet identifier field, a multicast address field, a multicast extended header field as shown in the FIG. 13 to the FIG. 16, this realization procedure of multicast includes multicast announcement, multicast tree establishment, multicast communications and multicast termination four steps, they are described in details as follows:

1 The step of multicast request:

A user hands in an multicast setup request with the parameters of IP multicast address of this multicast group, the address of the ED connecting with the source, all the addresses of the EDs connecting with the destination point, related IP addresses and resource requirements of multicast links etc.

2 The steps of multicast establishment (1) A network management device sends a configuration command with the parameters of dual-address connectionless data network address, the destination ED address, multicast link resources with the special types of streams.

(2) The node device in a dual-address data network, sends an accept/reject response to a network management device according to its resource situation, if the command is a reject response, that means this multicast can not be established, if the command is an accept response, that means this multicast is established.

(3) After a multicast is established, the network management device sends an ADT an address mapping table with an IP multicast address, dual-address connectionless data network multicast address, and the addresses of all the EDs connecting with the destination points, related IP addresses.

3 The Steps of Multicast Communications (1) The source of this multicast group establishes a connection with the EDs through tunnel technology etc. and configures the resources needed by the multicast.

(2) A destination of this multicast group sets up a connection with an ED through tunnel technology etc., the resources needed by the multicast is configured to the connection channel.

(3) The multicast source device sends multicast packets to the EDs through the communications channels which resources are configured by the tunnel;

(4) Multicast packets are ensured to reach the destination EDs with the quality of transmission designed by the dual-address data networks according to the multicast addresses within the scope of determined resource.

(5) The destination ED sends packets to the destination through tunnels etc. which are communication channels with resources guaranteed.

4 The steps of multicast termination:

(1) A user sends a multicast termination request to a network management device to terminate a multicast.

(2) The network management device sends a multicast termination command with the parameters of a multicast address and the resource releasing configuration of the special stream type.

After the multicast termination is conformed, the network management device sends a multicast termination command to an ADT; the ADT cancels all the table items related to this multicast address.

Multicast is terminated.

During the procedure of multicast communications, there is an entire header and an entire multicast extended header in the first packet, there are all the NCT addresses in the multicast extended header. In which, the first multicast packet and the leaf node packet modified need to be conformed, therefore, they are sent in the command packet. Because there are the cache capability in all the node devices within a NCT data network, after the first multicast packet passes, all the NCT multicast addresses and all the NCT addresses of the leaf node EDs may be stored in the cache, while the following packets arrive, only NCT multicast is needed. So, there may not be any multicast extended packet header within the headers of the following packets.

The multicast initiated by a user can ensure the resources needed by the services to a network management device, so that it can ensure the QoS of multicast service, and there is broad applications room.

Figure 20:
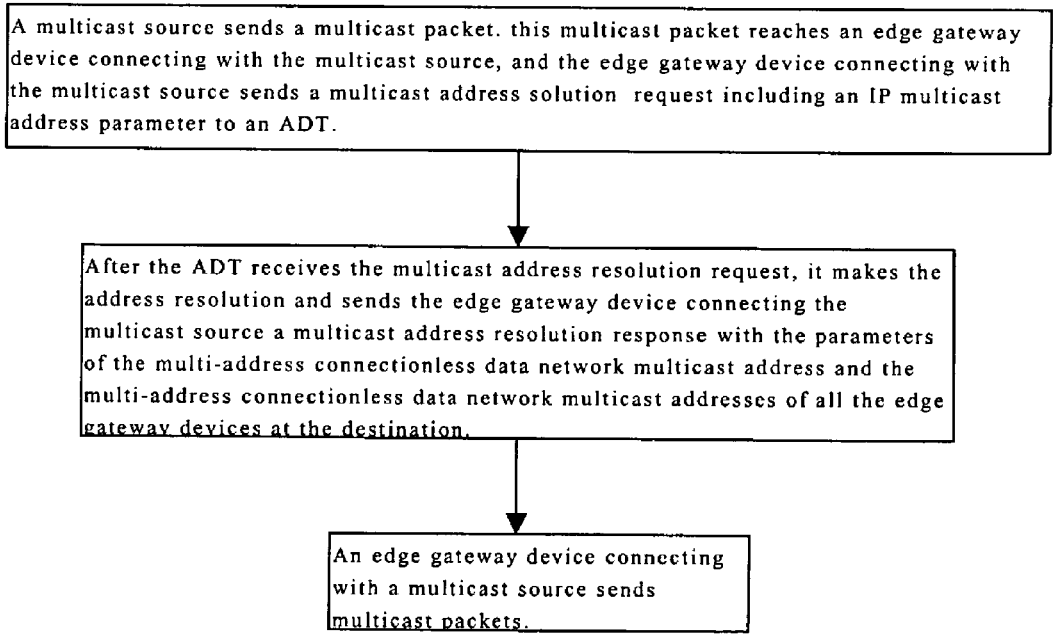
FIG. 20 is the flow chart of multicast communication procedure shown in the FIG. 17.

Under the situation while the multicast is initiated by a user, three fields within the packet format are defined for a multicast: a multicast identifier field, a multicast address field, and a multicast extended header. As shown in the FIG. 12 to the FIG. 20, the multicast realization procedure includes multicast announcement, multicast tree establishment, multicast communications and the multicast termination (not shown in the figure) four steps, they are described in details as follows:

1 The steps of the multicast announcement:

(1) A multicast source in an IP network gets an IP network multicast address according to the flow of request a multicast address in an IP network.

Within the IP telecom network system, a basic technical thought is to use a technical solution which is proved to be feasible by the current implementations. This technical step is a typical example, what is used is the existing technology. The IP network multicast addresses described above are the class D IP address (224.0.0.0~239.255.255.255).

(2) A multicast source sends a multicast notice packet to a network.

There is a multicast address of this packet within a multicast notice.

(3) The multicast notice packet reaches the ED connecting with the multicast source through an IP network, the ED sends a multicast request with the parameters of IP multicast address etc. to an ADT.

(4) After the ADT receives the multicast request with the parameters of an IP multicast address etc. from the ED, a mapping table between the IP multicast addresses and dual-address connectionless data network addresses is produced within the ADT, and a multicast response with the parameter of the dual-address connectionless data network multicast address is sent out to an ED.

As mentioned before, there is a mapping relationship table between the IP network addresses and the NCT data network addresses in an ADT, the multicast address in an NCT data network corresponding to an IP network multicast address using this table.

2 The steps of multicast tree establishment:

(1) An IP network device which wants to join a multicast sends a multicast join request with the parameter of an IP network multicast address etc. to an IP network;

(2) After an ED at the destination receives the multicast join request packet with the parameters of the IP network multicast address etc. through a tunnel or some technology in current IP network used to realize a multicast, it sends the multicast join request packet with the parameter of the IP network multicast address etc. to an ADT;

(3) After the ADT receives the multicast join request packet with the parameter of the IP network multicast address etc. it keeps this multicast address and the dual-address connectionless data network address of the ED at a destination, all the multicast addresses of dual-address connectionless data network and the dual-address connectionless data network addresses of all the EDs at the destinations.

(4) After all the nodes which want to join this multicast join the multicast, a multicast tree is established.

3 The steps of multicast communications:

(1) Multicast packets are sent from a multicast source to a network, they reach an ED connecting with the source by tunnel or IP multicast protocol technology etc., the ED connecting with the multicast source sends a multicast address resolution request with the parameter of IP multicast address etc. to an ADT.

(2) After the ADT receives the multicast resolution request, it make the address resolution and sends the ED connecting the multicast source a multicast address resolution response with the parameters of the dual-address connectionless data network multicast address and the dual-address connectionless data network multicast addresses of all the EDs at the destination.

(3) The first packet with the same multicast address sent by an ED connecting with a multicast source is named as the first packet, there is an entire header and an entire multicast extended header in the first multicast packet, there are dual-address connectionless data network addresses of all the EDs at the destination.

(4) The second packet and the packets following with the same multicast address sent by an ED connecting with a multicast source are named as the following packets; there may not be a multicast extended header in the following packets.

(5) A multicast packet includes: a multicast identifier field, a multicast address field and a packet payload.

The first multicast packet contains a multicast extended header.

4 The steps of multicast termination:

A multicast source sends a multicast termination packet to a network, an ED connecting with the source sends a multicast termination packet with the parameter of IP multicast address etc. to an ADT, the ADT cancels all the table items related to this multicast address, the multicast is terminated.

For the ATM or Frame Relay (FR) devices which are not based on IP protocol, a multicast including ATM or Frame Relay devices can be realized while a mapping table between ATM addresses or frame relay addresses and NCT addresses is prepared in an ADT, and the address translation work is done within an ED.

The method used to process resource management in an IP telecom network system described in this invention is discussed in details as follows.

As an implementation method of next generation telecommunication network, the IP telecom network must take new resource management mechanism in order to use the hardware resources of the IP telecom network, and to meet users' requirements in many aspects flexibly and high efficaciously, and to ensure that all the telecommunication services over IP telecom network to have QoS guarantee expected. Therefore, this inventor gives two kinds of resource management methods in details to suit the technical characters of an IP telecom network; they are the resource management method based on link alarm link alarm mechanism and the resource management method based on signaling mechanism.

We first introduce the resource management method based on link alarm mechanism. This method is to divide the services into several classes of services; each class of service includes several VPNs, to provide communications resources guarantee for users. Each VPN owns independent communications resources with corresponding link alarm mechanism. User resource requirements are managed using link alarm mechanism in order to control the communications resources of the entire network. In fact, the resource management method based on link alarm mechanism is built on basis of combining diffserv and VPN, this method suits for users with large amount of resources, such as the case of telecommunications services operators.

There are four key points to realize the resource management technology combining diffserv and VPN together: first of all, there should be networks which support diffserv and large amount of VPNs with independent resources. Secondly, the edge access devices in the networks which support diffserv should have the capabilities to diffserv, manage and control traffic of services for users to use. Thirdly, the services classifying should be scientific, in other words, the classes of services should not be too much, and services classifying should be done at the edge nodes in a managed network of a network operator. Fourthly, network nodes' performance should be good enough to mange huge queues.

Within an IP telecom network, as a core network, the NCT data network should have uniform management mechanism, and have the capabilities to assign corresponding network resources to each service based on their needs for the network resources. Combining with a network management device, it is easy for an ED to have the capabilities to classify services, manage and control services traffic used by users, and this ED may be controlled completely by an operator using a network management device.

There are two layers for resources management within an IP telecom network system, i.e. carrier network resources management and services resources management. Carrier resources management includes the following two aspects: one is that a network management device assigns resources to the network node devices; another one is that a network node device reports its link alarm state to a network management device. Within a service network, its user-network interface (UNI) uses connection oriented technology to set up connections for each service and ensures the resources needed by the a service, and the network to network interface (NNI) mainly uses connectionless technology and uses connection-oriented technology sometimes, there is not necessary to set up any connection and to maintain corresponding resources for each service, link alarm mechanism is used to manage the resources, and the network ED has the responsibility to search the alarm status of a network manager.

Figure 21:
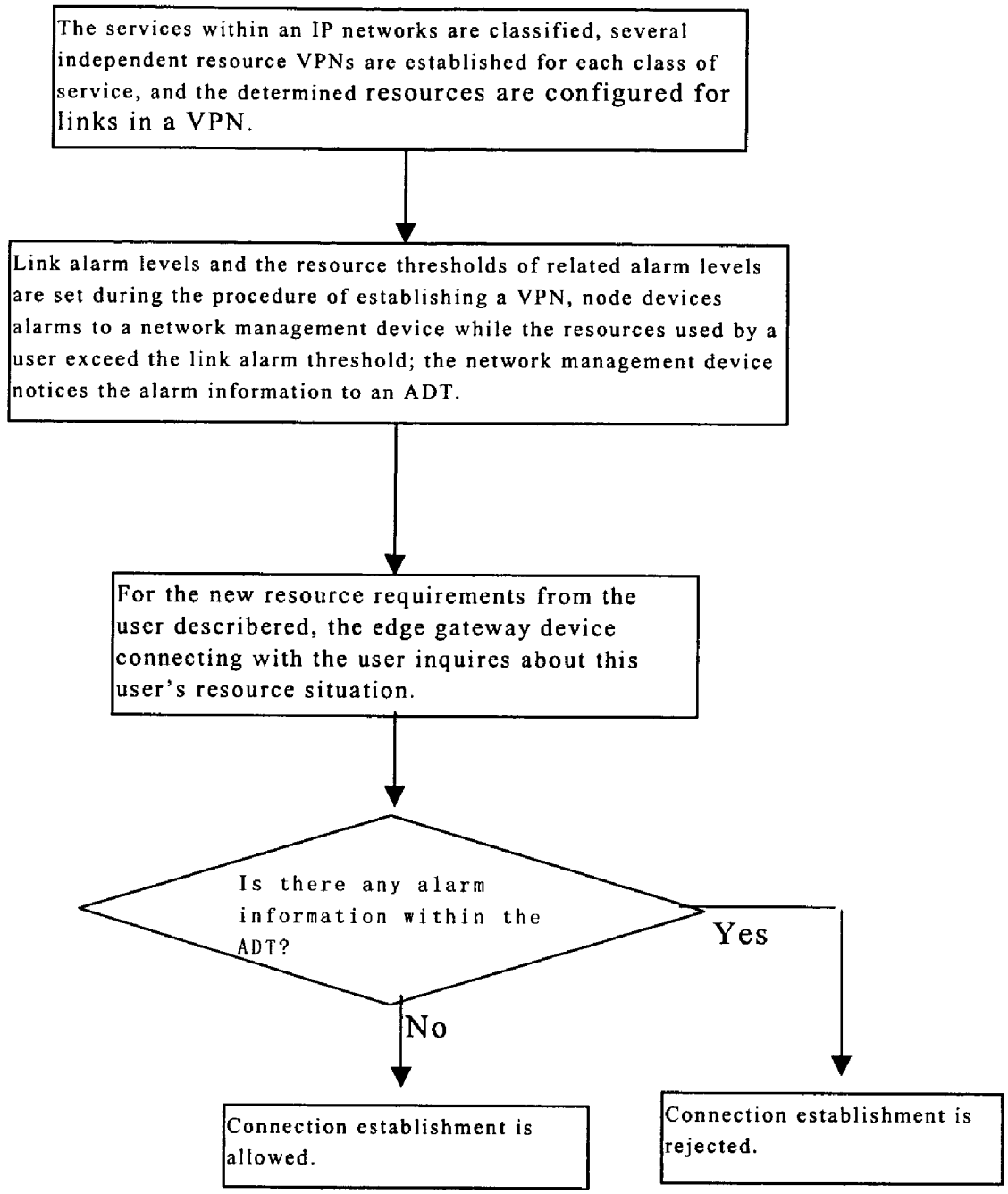
FIG. 21 is the flow chart of resource management method based on the link alarm link alarm mechanism within an IP telecom network system.

As shown in the FIG. 21, generally speaking, the resources management method based on link alarm mechanism above may be divided into three phases, they are: the VPN establishment phase to realize resources configuration, the link alarm phase and the resource search and access control phase. They are discussed in details below.

A special character of an IP telecom network is that the resource configuration is achieved during the establishment procedure of a VPN with independent resources. Refer to the two methods to establish a VPN among network node devices in the context for details about this procedure, it is not described here.

After a VPN is established, a user generally uses the telecommunications in the resource framework assigned to this VPN. But, telecommunications service has the specialty that the resource requirements are variable for a service, and the maximal value may be ten times lager than the minimal one, in this case, link alarm mechanism is needed to solve the problem when user resource requirements are extended the limit of that a VPN can supply.

The steps of link alarm mechanism are:

A link of resource alarm is composed of node devices, network management devices and ADT devices.

In fact, the link of resource alarm is a series of network management devices, node devices and ADT devices participating in a VPN.

While the resources used by users of some service have not extended the threshold value of this service link alarm, the node devices in an NCT data network do not send out alarm information; while the resources used by users of some service extend the threshold value of this service link alarm, or the resources used by users of some service VPN extend the threshold value of this VPN link alarm, the node devices in an NCT data network send alarm information with the parameters of the class of service, the VPN number, the alarm level etc. to a network management device.

The link alarm threshold value has been determined as soon as the resources are assigned, i.e. while a VPN is established.

The network management device sends alarm information with the parameters of the class of service, the VPN number, the alarm level etc. to an ADT device.

There are the class of service, the alarm level and the related VPN number in the link alarm notice sent by a network management device to an ADT, but due to the character of NNI mentioned before, it mostly uses connectionless technology, and uses connection-oriented technology sometimes, the network management device does not indicate the special alarm link to the ADT device.

After the link alarm mechanism is used, while a user requests to make a communication connection, firstly an ED searches this user's VPN resources status from an ADT, if there is not any alarm information about the corresponding VPN resource, the connection can be established immediately.

The resource search and access control mechanism is used while the ED searches the resource status to an ADT, it includes the following steps:

I) While a user or a service network requests to make a communication connection, firstly, an ED searches this user's or the service network's resources status to an ADT, if there is not any link alarm information about this user or the service network, the communications connection is set up following the normal service flow.

ii) If an ADT finds link alarm about this user or the service network, the ADT sends a resource search request to an network management device to search if there is any link alarm on the links passed by this connection, while there is not any link alarm, the ADT indicates that there is not any link alarm for this user or service network, communication connection is processed following the normal service flow; while there is some alarm along links passed, the ADT indicates that there is some alarm on the links of this user or the service network, this communication connection can not be established.

As mentioned above, the resource management method based on link alarm mechanism is built on the basis of combining the diffserv and the resource independent VPN technology. The access control mechanism based on VPN is discussed above, below the "diffserv" is introduced simply.

So-called "diffserv" is to divide services into several classes, then each class of service is divided into several subclasses, and it is identified within frame structure. Within a subclass, different VPN has its own resource. For different classes of services, different resource policies are used:

I) For the statistic multiplex services with permitted rate or peak rate, their rate acceptance control policy is determined by link alarm level, peak rate is accepted without link alarm, As the link alarm level increases, the acceptance rate is changed from a peak rate to a permitted rate gradually, if the level of link alarm is extended some level, the connection can not be established.

II) For the "best offer" services, normally there is a special service identifier, link alarm mechanism is not used to this kind of service, and the network uses normal "justice arithmetic" to meet service requirements.

III) For other classes of services, different thresholds of link resource are set, different rate acceptance control policies are taken according to the alarm information of different thresholds, the rate acceptance control is implemented at EDs In addition, for the emergency communication services, such as alarm telephone, fire alarm telephone etc, if a user requests to set up a connection, even an ADT indicates there is some link alarm for this user or the service network resources, an emergency communication can be established and is processed following the normal service flow. Within an IP telecom network, the routing to send data message is fixed. It may be single routing; it may also be dual-routing or multi-routing combining with one main routing and one or more backup routings. The routing passed by any end to end message transmission is fixed. Combining the dual-routing technology and the control commands of a network management device together may realize fast network protection switching under the guaranteed resources.

The resource management method based on signaling mechanism specially suits the telecommunications users and enterprise users with limited resources. In this case, several VPNs are set up to meet these telecommunications users requirements, in other word, the services in an IP network are divided into several classes, each class of service contains several VPNs to meet different users. Each VPN owns independent resource, and the resources within a VPN are managed using signaling to ensure users requirements to the resources.

Figure 22:
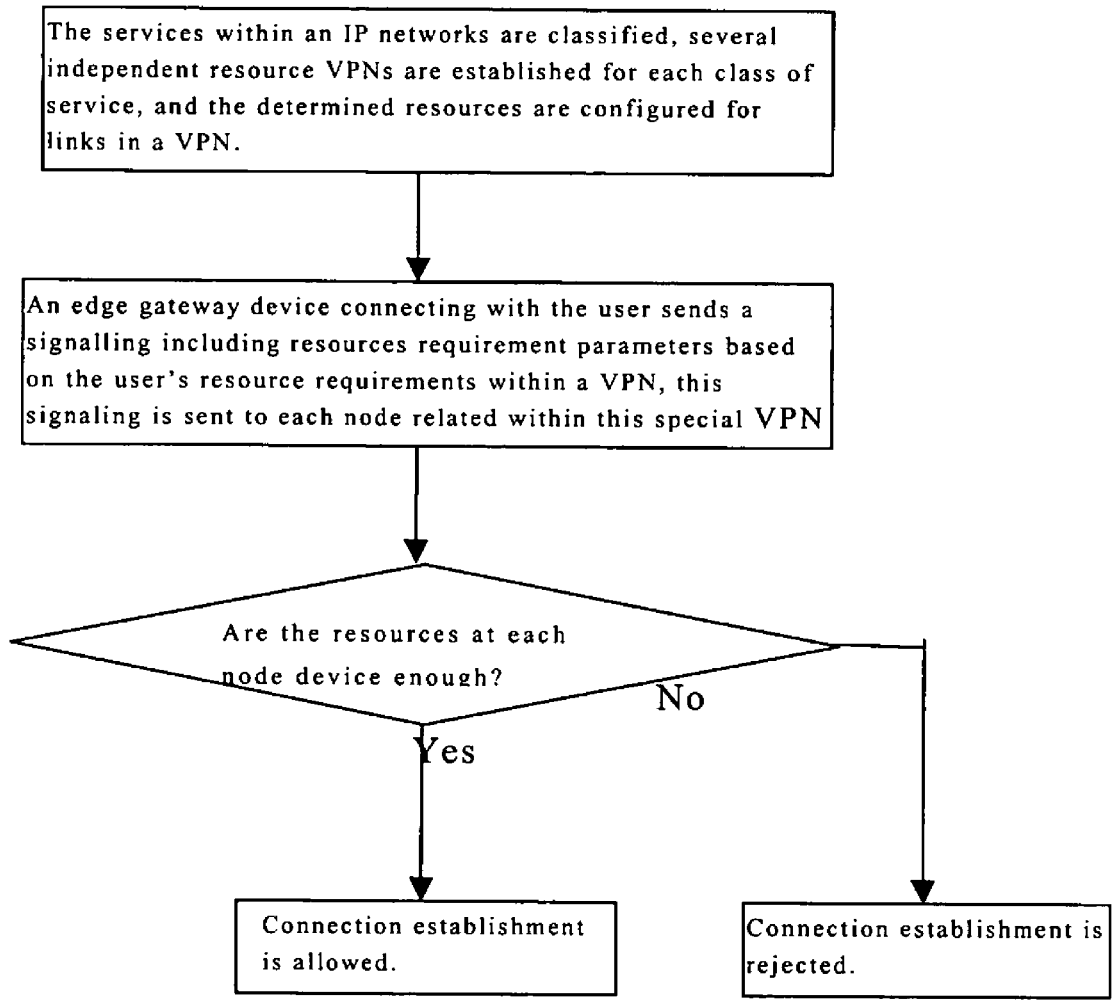
FIG. 22 is the flow chart of resource management method based on signaling mechanism within an IP Telecom Network system

As shown in the FIG. 22, there are two main phases for this resource management method based on signaling mechanism, they are: 1 to set up VPNs to realize the resource configuration; 2 using signaling procedures access control and resource management. It is discussed in details below.

One feature of an IP telecom network is that the resource management is done by establishing different resource independent VPNs. The procedure of resource configuration is done at the same time as the procedure of VPN establishment. For the discussion about this procedure in details, please see the two methods used to set up VPNs among network nodes in the context; we do not discuss it here.

Of course, the link resource alarm mechanism does not suit for the VPN users with limited resources, because even the threshold value is set to 50%, for example, one link resource within a VPN is set to be 2 Mbit/s, now the resource of 900 kbit/s has been used, because the threshold has not been reached, there should not be any alarm within the VPN, if a call which needs the resource of 1.2 Mbit/s requests to access, a network access end can not know that some link resource is not enough to afford the access within the network, without alarm information, the access end still accepts this calling, in this case, this VPN will use other's resources, it is not permitted, because the network resource assignment can not be ensured.

In this case, signaling mechanism need to be used to assign resources accurately.

For implementation, for the VPN users with limited resources, one connection should be established between a sending ED and a receiving ED for each service calling, during the connection establishment the resource needed by this service is determined. If the link resources meet the requirements of this service, this connection can be established; otherwise, this connection can not be established.

The steps of signaling mechanism are as follows:

I) Sending ED directly sends a connection set up request command with the parameters of receiving ED address, the resource requirements etc, according to the resource requirements needed by a user.

II) After all the node devices along receive this command, each node device makes its own response based on the VPN resources existing at this node, if the VPN resources existing at one node can afford the resources needed by the connection setup request command, the connection set up command is sent to the next node device, otherwise, a connection set up failure response is sent to the sending device.

III) If a receiving ED receives this connection setup request command, that means that all the resources along within this VPN may meet the resource requirements of this calling, the receiving ED sends a connection setup conform response to the sending ED.

IV) All the node devices passed by this connection setup conform response delete the resources used by this connection, while the sending ED receives the connection conform response, this connection establishment is successful.

To enter normal communications phase.

To go to a connection disconnection phase after the communications finish.

VI) Both the sending ED and the receiving ED may initiate a disconnection phase, here, we take sending ED initiates disconnection as an example: sending ED sends a disconnection request command with the parameters of a receiving address, the resources etc.

VII) After each node device along receives this disconnection request command, it releases the resource used by this connection, and this part of resource is added to its VPN resource table and sends the disconnection request command to the next node device.

VIII) While the receiving ED receives the disconnection request command, the receiving ED sends disconnection conform response to the sending ED, this disconnection is successful while the sending ED receives the disconnection conform response.

During the procedure of communications, access control is only done at EDs, the node devices participating do not make any resource control and management.

The structure of an NCT packet and its implementation method used to meet the special requirements of an NCT data network within an IP Telecom Network system described in this invention.

Within an NCT data network, VPN and multicast may be realized efficiently, at the same time, the header of a packet can be compressed. But, these functions can not be realized for existing frame structure such as the structure within IPv6 protocol etc. therefore, some new frame structure needs to be provided and the method to realize these functions of an NCT data network using this frame structure also needs to be provided.

What are transmitted in a NCT data network within an IP telecom network system are NCT packets. Below, we first introduce the format of an NCT packet, and then we discuss the enveloping method of an NCT packet. At last, we introduce the transmit ion procedure of NCT packets.

Figure 23:
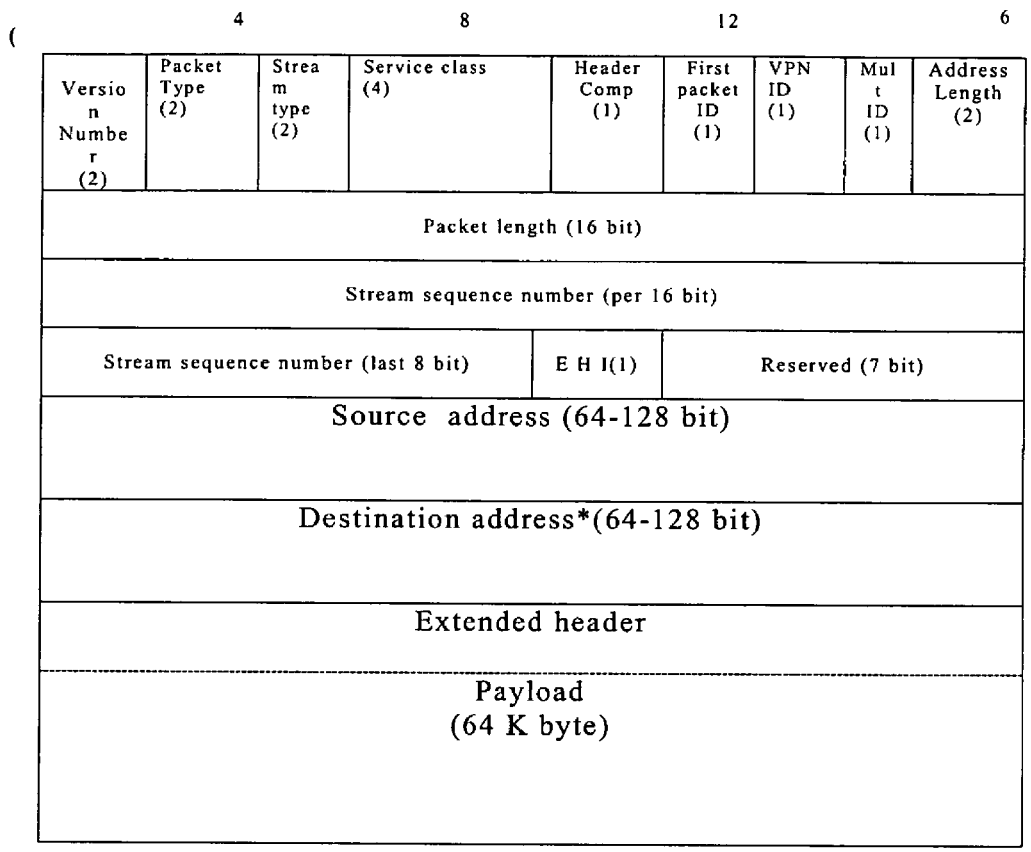
FIG. 23 is the illustration of an implementation method of the NCT packet format.

Refer to the FIG. 23, the header of a NCT packet described in this invention includes the following fields: a version number, the type of packet, the stream type, the class of service, a message compression identifier, the first packet identifier, a VPN identifier, a multicast identifier, the length of address, the length of packet, a stream sequence number, a source address, a destination address and an extended header.

The version number is the version of an NCT protocol, current version number is 1.

The packet type field of 2 bits is after the version number. When the value of the packet type is 0, it means that this NCT packet is a data packet, indicating that the contents within a payload are user data; while the value is 1; it means that the NCT packet is a control packet indicating that what in the payload is a control command, other values are reserved.

The stream type field of 2 bits follows the packet type field; it defines the type of the information stream. The example is as follows:

=00 guaranteed resource (without statistical multiplexing)
=01 high grade statistical multiplexing resource (guaranteed conventional data rate, allowing higher data rate.)
=10 guaranteed general statistical multiplexing resource, (taking 4:1 multiplexing rate, generally guaranteed the conventional data rate)
=11 providing "best offer" transfer capability.

Service class of 4 bits follows the packet type. It is used to represent different services combining with the stream type.

The header compression field lies after the service type field. While it is not set, it indicates that the header is not compressed; while it is set, it indicates the header is compressed.

The following 1 bit is the first packet identifier field; it indicates that the packet with the same source address, the same destination address, the same stream type and the same class of service is the first packet.

1 bit of VPN identifier field is used to represent if a packet is a VPN packet within an NCT data network. For example, while the field of VPN identifier of a packet is set, the packet is a VPN packet.

While 1 bit of multicast identifier field following the VPN identifier in a packet is set, the packet is a multicast packet, otherwise, it is not a multicast packet.

Because the lengths of a source address and a destination address is variable, 2 bits of address length field following the multicast identifier field is used to represent the length of a source address and a destination address in a packet. While the address length field is 0, it means that the lengths of a source address and the destination address are 32 bits of length; while the value of this field is 1, it means that the lengths of the source address and the destination address are 64 bits of length; while value of this field is 2, it means that the lengths of the source address and the destination address are 96 bits of length; while value of this field is 3, it means that the lengths of the source address and the destination address are 128 bits of length. In the implementation example described the default value of the address length filed is 2, i.e. the length of the source address and the lengths of the destination address are both 64 bits.

16 bits of the field after the address length field is the packet length field, it represents that the maximal packet length is 64 k bytes.

The length of the stream sequence number field is 24 bits; it lies after the packet length field. While this field is used for header compression, it represents the order of each packet with the same source address, the same destination address, the same stream type and the same service class.

The source address and the destination address are the addresses within an NCT data network, their lengths are variable, and its default value in this implementation is 64 bits.

The extended header is used when needed. We explain its functions in a multicast service and a VPN service in the packet enveloping method below.

The maximal length of a payload is 64K bytes.

Figure 24:
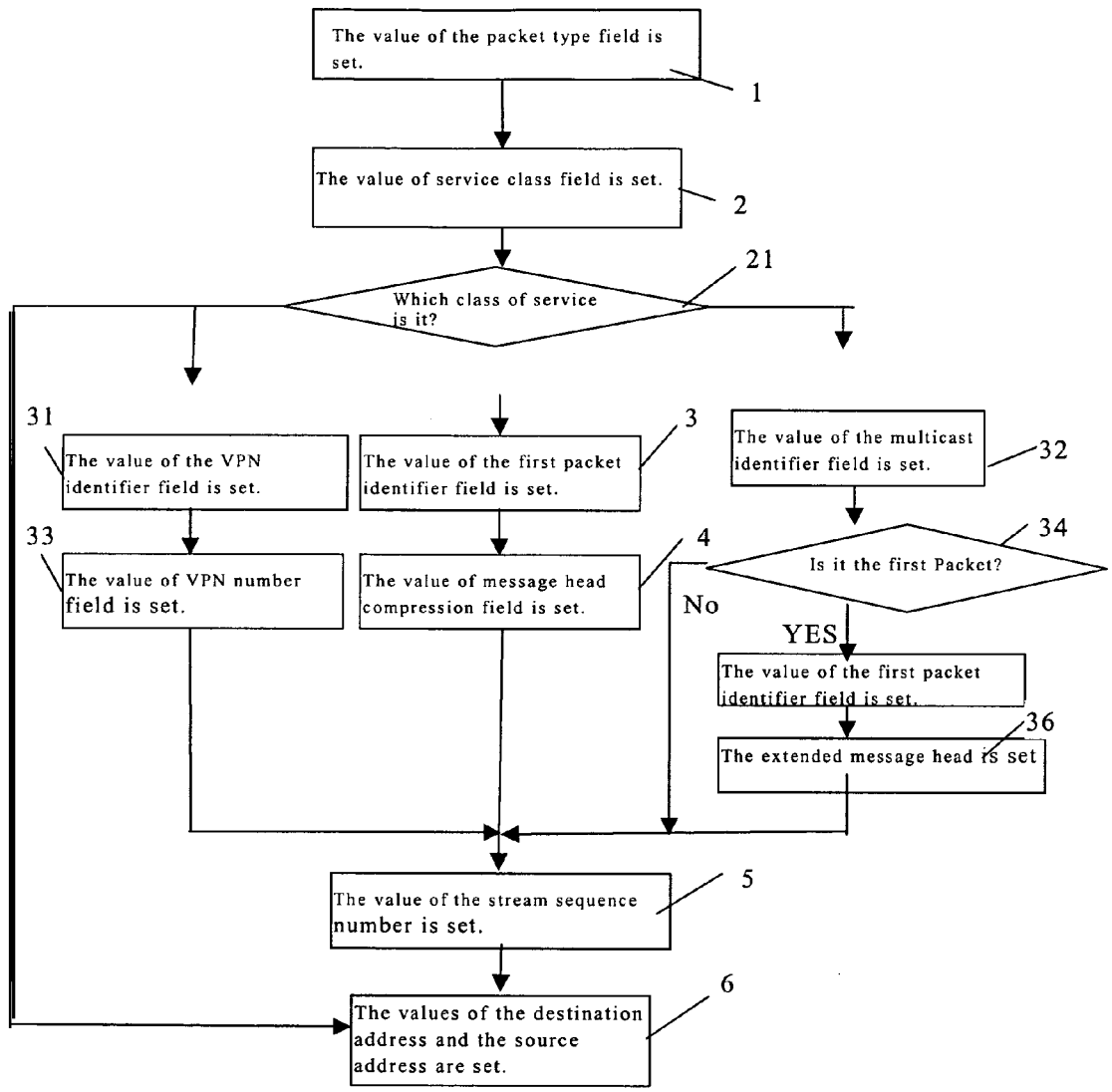
FIG. 24 is the flow chart of packet enveloping method within a NCT data network.

The method of NCT packet enveloping is described in the FIG. 24 and the NCT packet format combining special service flow, such as VPN, multicast etc. in details. If the source is in an IP network, an NCT packet is formed according to the method described in this implementation based on the contents of the packet of the source by an ED. The source ED receives this IP packet of an IP network, and sends the IP destination address in this IP packet to an ADT; the address resolution and address mapping between IP destination address and NCT address is done by an ADT, and the NCT address of the destination ED is sent to the source ED; the source ED changes it into an NCT packet by adding an NCT header to the IP packet based on the NCT address sent back, then sends this NCT packet to the destination ED; the destination ED receives this NCT packet, and changes it back into an IP packet and forwards this packet to an IP network based on the destination IP address.

If a source is a node in an NCT data network, this node envelops NCT packets according to the method described in this implementation example.

The NCT enveloping method includes the following steps:
1) An ED sets the value of the service class field based on either a packet is a data packet or a control packet.
2) An ED determines the class of service based on the characteristic of its carrier service network, the class of service is composed of 2 bits of packet type field and 4 bits of service class field, the first one is a large class to determine a service, and the last one is a subclass of service. The service class represents different services combining with the stream type.
21) An ED determines if the data packet coming needs to compress the header, or to be sent in a VPN, or to be multicoated, if it does, go to the step 3, the step 31) and the step 32) separately; if it does not, go to the step 6) directly.
3) To determine the value of the first packet identifier field. First of all, to determine if it is the first packet, if it is, the first packet identifier field is set; if it is not, that field is not set. An entire IP packet is put in its payload while enveloping for the first packet. Where, an entire IP packet refers to an IP header and a payload.
4) The value of header compression field is determined. The packets are determined to be the following packets of some first packet based on the IP source addresses, IP destination addresses and service class's information within them, for the packets which first packet identifier field is not set. To determine whether their header fields needed to be compressed as needed. If they do, their header fields are set that represents the NCT packets with the header field compression. There is only a payload part in IP packets without IP headers in their payloads, for the packets which first packet identifier field is not set.
5) To set the value of the stream sequence number. While enveloping, different stream sequence numbers are used to represent the orders of packets with the same source addresses, the same destination addresses, the same service classes. While opening, corresponding IP headers are derived from the mapping table between the stream sequence numbers and the IP headers based on the values of the sequence numbers.
6) To set the values of the destination address and the source address. The destination address and the source address refer to the NCT address of the destination ED and the NCT address of the source ED.

In addition, there are the following steps after the step 21); while a VPN service is determined to be carrier service in the step 21).

31) The value of the VPN identifier field. When the VPN identifier field is set, the extended header identifier field is set, it represents that the packets transmitted within a NCT network are VPN packets. Then go to the step 33), the VPN number field is used to differentiate to which VPN each packet belongs separately.

33) The value of the VPN number field is set. The value of the VPN number field in the extended header should be determined while enveloping the NCT packets with the same source addresses, the same destination addresses. The VPN number is exclusive in a NCT data network.

After the steps above are finished, go to the step 5), the value of the stream sequence number is set. At last, go to the step 6), the values of the destination address and the source address is set.

There are the following steps after the step 21), if the carrier service is determined to be multicast service:
32) The value of the multicast identifier field is set. Setting the multicast identifier field represents that the service is multicast service, go to the step 34)
34) If the packet is the first packet of a multicast service, the value of the first packet identifier field is set, go to the step 5).
36) The value of the extended header field is set. If it is the first packet of a multicast service, the value of the extended header needs to be given. There are NCT addresses of the entire destination EDs (leaf nodes) in an extended header, go to the step 5).

The NCT addresses of the entire destination EDs (leaf nodes) are provided by an ADT. The stream sequence number is given in the step 5), and then goes to the step 6).

In the step 6), the multicast address is similar to the class D address, representing the NCT multicast address within a NCT network. The multicast source initiating multicast service request within an IP network sends IP multicast address according to IP protocol, the ADT determines the multicast address in a NCT network based on a relationship table between IP multicast addresses and NCT multicast addresses it stores, and this NCT multicast address is enveloped into the destination address field of a NCT packet by an ED. If the multicast source initiates this multicast service request is a node within a NCT data network, then the node within the NCT data network sends a multicast service request to an ADT, the ED envelops this NCT multicast address given by the ADT into the destination address field of a NCT packet.

Within an IP telecom network system, a packet transmitted in an IP network is composed of an IP header and an IP payload, its IP address is used to address within an IP network; a packet transmitted in a NCT network is a NCT packet which is composed of a NCT header and a NCT payload, its NCT address is used to adder in a NCT network, and the NCT payload of the NCT packet transmitted within a NCT network is an IP packet. So, within a NCT network, a NCT packet is composed of a NCT header, an IP header and an IP payload, within an IP network, because the IP packet, especially for an IP packet which carries real time service, for example a VOIP packet, its payload is generally shorter than 40 bytes, but the length of a NCT header+an IP header+an IP payload may be twice long as the length of a payload, it obviously reduces the data transmission efficiency of the whole network and increases the burden of the network devices, therefore it needs to be modified.

Below, we introduce further a header of an IP packet compression method within an IP telecom network. To implement this method, first of all, the first packet identifier, the packet compression identifier and the stream identifier need to be set within the header of a NCT packet.

The NCT packet format in the identifier domain above is set as shown in the FIG. 23. This format is only an example rather than exclusive one. Its format refers to the packet format defined in IPv6 protocol, but this format has obviously difference from IPv6 packet format. As shown in the FIG. 23, the first packet identifier domain, a packet compression identifier domain and a stream identifier domain are added in this packet format specially to meet the requirements of the header compression, within which, the meaning of 1 bit first packet identifier is the same as that defined in IPv6 protocol, setting this bit represents that the header has been compressed, otherwise, the header has not been compressed; the stream identifier is the stream sequence number assigned to this service by the system.

Figure 25:
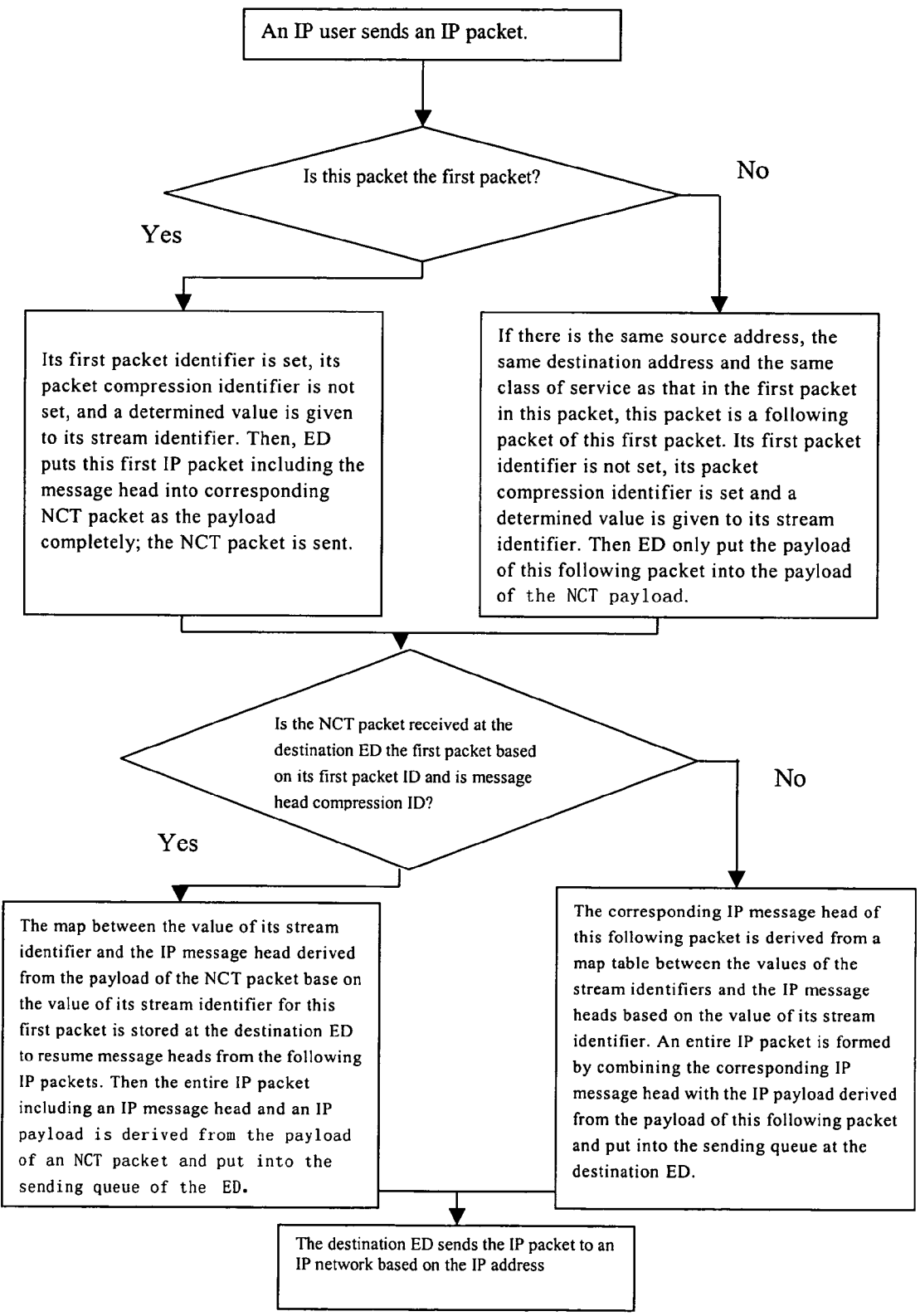
FIG. 25 is the flow chart of packet compression method in this invention.

As shown in the FIG. 25, at the source ED, firstly, an IP packet transmitted in an IP network is determined if it is the first IP packet, if it is, its first packet identifier is set, its packet compression identifier is not set, and a determined value is given to the stream identifier. Then, the source ED puts this first IP packet including the header into corresponding NCT packet produced as the payload of the NCT packet completely, in this way, the NCT packet produced is: NCT header+IP header+IP payload.

ED determines if the following packets transmitted from an IP network are the following packets of this first packet by analyzing their headers. If there is the same source address, the same destination address and the same class of service as that in the first packet in one packet, the packet is a following packet of this first packet. Its first packet identifier is not set, its packet compression identifier is set and a determined value is given to its stream identifier. Then the ED only puts the payload of this following packet into the payload of the NCT payload, and its IP packet is not put into the NCT packet, i.e. the NCT packet is: NCT header+IP payload.

The NCT address included in an NCT header is used to address by a NCT packet bearing IP payload until the NCT packet reaches the destination ED.

If the first packet identifier within its header of a NCT data packet received by the destination ED is set and the header compression identifier of the NCT is not set, this packet is determined to be the first packet which header has not been compressed. The mapping between the value of its stream identifier and the IP header derived from the payload of the NCT packet base on the value of its stream identifier for this first packet is stored at the destination ED to resume headers from the following IP packets. Then the entire IP packet including an IP header and an IP payload is derived from the payload of an NCT packet and put into the sending queue of the ED.

If its first packet identifier is not set, its packet compression identifier is set for an NCT data packet received by a destination ED, this NCT data packet is determined to be a following packet of some first packet based on the value of its stream identifier. The corresponding IP header of this following packet is derived from a mapping table between the values of the stream identifiers and the IP headers based on the value of its stream identifier. An entire IP packet is formed by combining the corresponding IP header with the IP payload derived from the payload of this following packet and put it into the sending queue at the destination ED.

Because an IP telecom network system is a kind of connectionless data network without using any complex control technology, the first packet may be lost. In this case, at the destination ED, a corresponding IP header is derived from a mapping table between the values of the stream identifiers and the IP headers based on the stream identifiers for a packet received in which the first packet identifier is not set, the packet compression identifier is set, if there is not a corresponding item for the value of its stream identifier within the header mapping table, the first packet with this value of this stream identifier has not been received, the destination ED sends an error report packet of "the first packet has not been received", after the source ED receives this error report packet, it sends the first packet with this stream identifier.

In addition, because it is possible for the following packets transmitted in an IP telecom network to be lost, in order to avoid the mapping table between the stream identifier of this packet and IP header from engrossing an ED's memory for a long time without any actions, a timer may be set for each packet at a destination ED, once the timer is overtime, the ED cancels this table items and the mapping table automatically. Through the technical steps above, within an IP telecom network system, the IP header in an IP packet with the same source address and the destination address and the same class of service only needs to be transmitted once, so that the total amount of data volume is decreased and the aim of the header compression is achieved.

It must be pointed out that the first packet identifier and the packet compression identifier works independently, it is not necessary for all the packets to compress. If a packet does not need to be compressed, the packet compression identifier is not needed but the first packet identifier may still be needed.

The header compression method is not only used for the transmission of an IP packet through an NCT data network, but also used for the transmission procedure of an NCT packet through an IP network. Even the header of ATM packets or Frame Relay packets transmitted by an ATM device or a frame relay device connecting to an NCT data network may be compressed using the method described above.

In the tunnel operation mode, an NCT address has been replaced by a connection ID and the connection ID is only available in a local area, it can not be compassed, so only the IP address as a packet payload can be compressed further. Therefore, the first packet identifier, the packet compression identifier and the stream identifier in its header may be set solely for the first packet of IP packets according to the method described above, this first packet of IP packets is still put into an NCT packet as a payload of an NCT packet entirely, at the same time, the identifiers above are maintained in the header of an NCT packet, the information in the identifiers above are not changed when an NCT address is replaced by a connection ID so that these identifiers may reach a destination device directly. The values of the stream identifiers and the IP headers are derived to form a mapping table at a destination ED. The IP headers in the following IP packets are not transmitted, and only the identifier information is transmitted. In this way, a destination ED may determine which first packet the following packets belong to according to their stream identifiers to resume the IP headers of these following packets. The method above may let the header of a packet compression method be used in tunnel operation mode to improve the efficiency of the network transmission further.

The whole technical solution of an IP telecom network system described in this invention has been introduced in details above, but the real implementation forms of this invention are not limited to it. For the general technologists and technicians in this technical field, without deviating the spirit and the scope of right requested of this invention, all kinds of obvious improvements to it are within the protection scope of this invention.

What is claimed is:

1. An IP Telecom Network system, comprising:
    at least one dual-address connectionless data network with a plurality of devices;
    a plurality of IP networks; and
    a plurality of edge gateway devices;
    wherein the plurality of IP networks connects to the at least one dual-address connectionless data network through the plurality of edge gateway devices;
    wherein the at least one dual-address connectionless data network includes at least one address mapping device with an address mapping table;
    wherein each device within the dual-address connectionless data network and each edge gateway device are individually assigned an address of the dual-address connectionless data network, and each device within the IP network and each edge gateway device are individually assigned an IP address;
    wherein a mapping relationship between the IP address and the dual-address data networks address is stored in the address mapping table of the address mapping device;
    wherein both addresses in the dual-address connectionless data network is the IP address used to address outside the dual-address connectionless data network;
    wherein the dual-address connectionless data network address is used to address within the dual-address connectionless data network;
    wherein the two operation modes which can be used within the dual-address connectionless data network at the same time are the connectionless operation mode and a connection-oriented tunnel operation mode; and
    wherein an assignment for address of the dual-address connectionless data network follows a location related layered structure address assignment rule.

2. The IP Telecom Network system of claim 1, wherein the dual-address connectionless data network is a type of dual-address and dual-operation mode data network which has a dual-address structure and workable in both connection-oriented and connectionless-oriented operation modes, and
    wherein the dual-address connectionless data network has a layered architecture.

3. The IP Telecom Network system of claim 2, wherein the dual-address connectionless data network further comprises:
    a core layer,
    a converge layer, and
    an access layer,
    wherein the core layer, the converge layer and the access layer separately formed multiple core layer devices, multiple converge layer devices and multiple access layer devices,
    wherein each access layer device connects with at least one edge gateway device and connects with a converge layer device upward;
    wherein the converge layer device connects with multiple core layer devices,
    wherein the multiple core layer devices connect with each other;
    wherein the dual-address connectionless data network contains a network management device and the address mapping device, and
    wherein the network management device manages the access layer device, the converge layer device and the core layer device.

4. The IP Telecom Network system of claim 1, wherein the edge gateway device converges service streams from IP networks and forward them to a destination edge gateway device at another side of the data network, and they are sent to a plurality of devices of IP networks at the destinations.

5. A method to implement communications of an IP telecom network comprising at least one dual-address connectionless data network with a plurality of devices, a plurality of IP networks, and a plurality of edge gateway devices, wherein the plurality of IP networks connects to the at least one dual-address connectionless data network through the plurality of edge gateway devices, wherein the at least one dual-address connectionless data network includes at least one address mapping device with an address mapping table, wherein each device within the dual-address connectionless data network and each edge gateway device are individually assigned an address of the dual-address connectionless data network, and each device within the IP network and each edge gateway device are individually assigned an IP address, and wherein a mapping relationship between the IP address and the dual-address data networks address is stored in the address mapping table of the address mapping device, comprising the steps of:
    (1) addresses of the dual-address connectionless data network are assigned to all devices within the dual-address connectionless data network;
    (2) edge gateway devices register and send address mapping relationship tables to address mapping devices after passing authentications;
    (3) a source edge gateway devices receive IP packets from IP networks and send IP destination addresses within the IP packets to address mapping device;
    (4) the address mapping device makes address resolution and mapping between IP destination address of IP network and dual-address connectionless data network address and sends the dual-address connectionless data network address of a destination edge gateway device received back to the source edge gateway device;
    (5) the source edge gateway device sends message to the destination edge gateway device based on the dual-address connectionless data network address;
    (6) the destination edge gateway device receives the message and forward the message received based on the destination IP address.

6. The method of claim 5, comprising a further step of:
    while a dual-address connectionless data network working in a connectionless operation mode, all devices within the network address use dual-address connectionless data network addresses, and an entire dual-address connectionless data network addresses in messages are transmitted within the dual-address connectionless data network.

7. The method of claim 5, comprising a further step of:
    In step (5), when a message is transmitted within the dual-address connectionless data network, the message is sent to an access layer device by the source edge gateway device, and it is forwarded to the converged layer device, then it is forwarded to a core layer device, if the core layer device decides that the message should be sent to the access layer device based on the dual-address connectionless data network address, the message is sent to the access layer device through the converged layer device, then the access layer device sends the message to a destination edge gateway device based on the dual-address connectionless data network address.

8. The method of claim 5, comprising a further step of:
In step (5), when a message needs to be sent from one dual-address connectionless data network to another dual-address connectionless data network, the message from the source edge gateway device is converged from an access layer device to a converged layer device to a core layer device, then it is forwarded to the another dual-address connectionless data network through the core layer device, then it is sent from the core layer device to its destination edge gateway device layer by layer within the another dual-address connectionless data network.

9. The method of claim 5, comprising a further step of:
the dual-address connectionless data network can handle one of an IP, ATM and Frame Relay data packets.

10. The method of claim 5, comprising a further step of:
while the dual-address connectionless data network working in a connection-oriented tunnel operation mode, a management plane or a control plane in the IP telecom network sets up tunnels within the dual-address connectionless data network, the tunnels are virtual circuits established among the edge gateway devices at both sides; when data frames are transmitted between adjacent two network nodes within a tunnel, connection labels are used to address.

11. The method of claim 10, comprising a further step of:
the dual-address connectionless data network address in the dual-address connectionless data network packet is replaced with a connection label between an edge gateway device and a next level network node by a source edge gateway device to form a dual-address data network data frame and the data frame is sent to the next level; the connection label within the data frame in the dual-address connectionless data network is replaced with the connection label between this node and its next level by the next level node to form a new data frame of the dual-address connectionless data network, the new data frame is forwarded along the tunnels; the data frame of the dual-address data network reaches the destination edge gateway device in this mode, the connection label is resumed back to the dual-address connectionless data network address at a destination edge gateway device.

12. The method of claim 10, wherein a tunnel establishment procedure comprising a further step of:
(1) a user sends a tunnel setup request to the network management device, the network management device authenticates this request;
(2) the network management device sends a tunnel setup command to the edge gateway device at a tunnel source;
(3) after the source edge gateway device receives this command, it sends a tunnel connection setup request to the edge gateway device at a tunnel destination;
(4) this request is sent level by level, each dual-address connectionless data network node device along the path makes their own decision according to their resource situation after they receive this request;
(5) if the node device meets the resource request needs, it configures link resources, assigns connection labels, fills in a link forward table and forwards this request to a next node until reaching the edge gateway device at a tunnel destination;
(6) If the resource situation of the edge gateway device at the tunnel destination can afford this tunnel connection establishment, then the destination edge gateway device sends an accept request response to the edge gateway device;
(7) the edge gateway device at tunnel source sends a tunnel setup acknowledgement response to the network management device, after the edge gateway device at tunnel source receives the accept response from the edge gateway device at tunnel destination;
(8) the tunnel is established successfully while the network management device receives the tunnel setup acknowledge response.

\* \* \* \* \*